(12) United States Patent
Tomioka et al.

(10) Patent No.: US 10,773,473 B2
(45) Date of Patent: Sep. 15, 2020

(54) FIBER-REINFORCED PLASTIC AND PRODUCTION METHOD THEREFOR

(71) Applicant: Mitsubishi Chemical Corporation, Tokyo (JP)

(72) Inventors: Masao Tomioka, Toyohashi (JP); Takeshi Ishikawa, Toyohashi (JP); Takayuki Kobayashi, Toyohashi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 71 days.

(21) Appl. No.: 15/856,938

(22) Filed: Dec. 28, 2017

(65) Prior Publication Data

US 2018/0117861 A1 May 3, 2018

Related U.S. Application Data

(62) Division of application No. 15/117,132, filed as application No. PCT/JP2015/054011 on Feb. 13, 2015, now abandoned.

(30) Foreign Application Priority Data

Feb. 14, 2014 (JP) .................................. 2014-026641

(51) Int. Cl.
*B29C 70/50* (2006.01)
*B29C 43/18* (2006.01)
(Continued)

(52) U.S. Cl.
CPC ............. *B29C 70/50* (2013.01); *B29C 43/18* (2013.01); *B29C 43/28* (2013.01); *B29C 43/34* (2013.01);
(Continued)

(58) Field of Classification Search
CPC ..... B29C 70/50; B29C 70/502; B29C 70/506; B29C 70/887; B29C 70/48; B29C 70/46;
(Continued)

(56) References Cited

U.S. PATENT DOCUMENTS 4,990,207 A * 2/1991 Sakai .................... B29C 70/345
156/242
5,824,178 A * 10/1998 Shingu .................. B29C 70/202
156/265
(Continued)

FOREIGN PATENT DOCUMENTS

EP 2 314 642 A1 4/2011
JP 63-247012 A 10/1988
(Continued)

OTHER PUBLICATIONS

Mallick, "Effect of Fiber Misorientation on the Tensile Strength of Compression Molded Continuous Fiber Composites", Polymer Composites, vol. 7, No. 1 (Feb. 1986). (Year: 1986).*
(Continued)

*Primary Examiner* — Michael N Orlando
*Assistant Examiner* — Christopher W Raimund
(74) *Attorney, Agent, or Firm* — Oblon, McClelland, Maier & Neustadt, L.L.P.

(57) ABSTRACT

The purpose of the present invention is to obtain a fiber-reinforced plastic that is capable of controlling anisotropy, has excellent mechanical characteristics, has little variation, has excellent heat resistance, and has good fluidity during forming. A production method for fiber-reinforced plastic, having: a step in which a material (A) (100) including a prepreg base material is obtained, said prepreg base material having cuts therein and having a thermoplastic resin impregnated in reinforcing fibers (110) arranged in parallel in one direction; a step in which a pressurizing device is used that
(Continued)

applies a substantially uniform pressure in a direction (X) orthogonal to the travel direction of the material (A) (100) and the material (A) (100) is caused to travel in the one direction and is pressurized while being heated to a prescribed temperature (T), an angle (.theta.) of −20-20 .degree. being formed between the orthogonal direction (X) and a fiber axial direction (Y) for the reinforcing fibers (110) of the prepreg base material; and a step in which the material (A) (100) pressurized by the pressurizing device is cooled and the fiber-reinforced plastic is obtained.

9 Claims, 4 Drawing Sheets

(51) Int. Cl.
*B29C 43/28* (2006.01)
*B29C 43/34* (2006.01)
*B29C 70/46* (2006.01)
*B29C 70/48* (2006.01)
*B29C 70/88* (2006.01)
*B29K 105/08* (2006.01)
*B29C 43/46* (2006.01)
*B29C 43/48* (2006.01)
*B29K 105/10* (2006.01)
*B29C 35/10* (2006.01)
*B29C 35/08* (2006.01)

(52) U.S. Cl.
CPC .............. *B29C 70/46* (2013.01); *B29C 70/48* (2013.01); *B29C 70/504* (2013.01); *B29C 70/887* (2013.01); *B29C 35/10* (2013.01); *B29C 43/46* (2013.01); *B29C 2035/0822* (2013.01); *B29C 2043/483* (2013.01); *B29C 2793/0036* (2013.01); *B29K 2105/0872* (2013.01); *B29K 2105/0881* (2013.01); *B29K 2105/105* (2013.01)

(58) Field of Classification Search
CPC ......... B29C 43/34; B29C 43/28; B29C 43/18; B29C 70/504; B29C 2793/0036; B29C 2035/0822; B29C 35/10; B29C 2043/483; B29C 43/46; B29C 2043/467; B29K 2105/105; B29K 2105/0872; B29K 2105/0881; B05D 2256/00; B05D 1/18
See application file for complete search history.

(56) References Cited

U.S. PATENT DOCUMENTS

| | | |
|---|---|---|
| 2010/0028593 A1 | 2/2010 | Taketa et al. |
| 2010/0233423 A1 | 9/2010 | Corden et al. |
| 2013/0095282 A1 | 4/2013 | Taketa et al. |
| 2015/0266260 A1 | 9/2015 | Fujioka et al. |
| 2018/0117861 A1 | 5/2018 | Tomioka et al. |

FOREIGN PATENT DOCUMENTS

| | | |
|---|---|---|
| JP | 63-267523 A | 11/1988 |
| JP | 5-4246 A | 1/1993 |
| JP | 7-164439 A | 6/1995 |
| JP | 2008-207544 A | 9/2008 |
| JP | 2008-207545 A | 9/2008 |
| JP | 2008-273176 A | 11/2008 |
| JP | 2009-286817 A | 12/2009 |
| JP | 2012-87190 A | 5/2012 |
| JP | 2013-202890 A | 10/2013 |
| JP | 2014-19780 A | 2/2014 |
| WO | 2010/013645 A1 | 2/2010 |

OTHER PUBLICATIONS

Office Action dated Apr. 29, 2019 in Indian Patent Application No. 201647026283 with English translation.
Office Action dated Mar. 5, 2018 in co-pending U.S. Appl. No. 15/117,132, 15 pages.
"AMILAN® Nylon Resin; Technical Information | About Heat-Resistant Nylon Resins CM1026 and CM3006 | General Properties" Toray Plastics, 2018, pp. 1-13.
International Search Report dated May 19, 2015 in corr. International Patent Application No. PCT/JP2015/054011, filed Feb. 13, 2015.
Japanese Office Action dated Jan. 5, 2016 in corr. Japanese Patent Application No. 2015-511744 (w/ English-language translation).
Extended European Search Report dated Mar. 1, 2017 in corr. European Patent Application No. 15749554.0
Non-Final Office Action dated May 27, 2020 issued in corresponding U.S. Appl. No. 16/122,270.

\* cited by examiner

FIBER-REINFORCED PLASTIC AND PRODUCTION METHOD THEREFOR

CROSS REFERENCE TO RELATED APPLICATIONS

The present application is a divisional of U.S. patent application Ser. No. 15/117,132, filed on Aug. 5, 2016, which is a 35 U.S.C. § 371 national stage patent application of international patent application PCT/JP2015/054011, filed on Feb. 13, 2015, which claims claims priority based on Japanese Patent Application No. 2014-026641, filed in Japan on Feb. 14, 2014, the disclosures of which are incorporated herein by reference.

TECHNICAL FIELD

The present invention relates to a fiber-reinforced plastic and a method for producing the same.

The present application claims priority based on Japanese Patent Application No. 2014-026641, filed in Japan on Feb. 14, 2014, the disclosure of which is incorporated herein by reference.

BACKGROUND ART

In various fields related to aircraft members, automotive members, wind power generating windmill members, sports goods and the like, structural materials that have been shaped by stamping molding sheet-like fiber-reinforced plastics are widely used. Such a fiber-reinforced plastic is formed by, for example, laminating plural sheets of a prepreg substrate that is obtained by impregnating reinforcing fibers with a thermoplastic resin, and integrating the laminate.

An example of the prepreg substrate is a product obtained by unidirectionally arranging continuous reinforcing fibers with a long fiber length in parallel, impregnating the arranged fibers with a thermoplastic resin, and forming the resultant into a sheet form. When a fiber-reinforced plastic formed from a prepreg substrate using such continuous long reinforcing fibers is used, a structural material having excellent mechanical properties can be produced. However, in this fiber-reinforced plastic, since continuous reinforcing fibers are used, fluidity at the time of shaping is low, and it is difficult to shape the fiber-reinforcing plastic into a complicated shape such as a three-dimensional shape. Therefore, in a case in which the fiber-reinforced plastic is used, the shape of the structural material thus produced is limited mainly to those shapes close to a planar shape.

Regarding the method for increasing fluidity at the time of shaping, for example, a method of cutting out plural prepreg pieces from a tape-like prepreg substrate having a narrow width into a constant length, dispersing the prepreg pieces in a planar form, integrating the prepreg pieces by press molding, and thus obtaining a sheet-like fiber-reinforced plastic, has been disclosed (Patent Document 1).

However, in this method, since the prepreg pieces are dispersed by causing prepreg pieces to fly by means of air or by spreading prepreg pieces in a liquid fluid and settling the prepreg pieces, it is very difficult to disperse the prepreg pieces uniformly such that the fiber axis directions of the reinforcing fibers are in completely random directions. Therefore, a fiber-reinforced plastic is obtained, in which mechanical properties such as strength vary depending on the position or direction even within the same sheet. In regard to structural materials, there is a high demand for materials in which there is less variation in the mechanical properties such as strength, and the mechanical properties are isotropic, or anisotropies thereof are under control. However, in this method, it is difficult to obtain a fiber-reinforced plastic in which mechanical properties are satisfactorily isotropic, or anisotropies thereof are under control, and there is less variation in the mechanical properties.

In addition, satisfactory heat resistance is also required from fiber-reinforced plastics. Generally, the heat resistance of a fiber-reinforced plastic is greatly affected by the heat resistance of the matrix resin used in the fiber-reinforced plastic. Typically, mechanical properties of a simple resin substance tend to deteriorate at a temperature higher than or equal to the glass transition temperature of the resin. Similarly, in the case of a fiber-reinforced plastic, mechanical properties tend to deteriorate at a temperature higher than or equal to the glass transition temperature of the matrix resin. In order to suppress this deterioration of mechanical properties to a minimum level, it is necessary to uniformly disperse reinforcing fibers in the matrix resin in the fiber-reinforced plastic. However, according to the method described above, in the process for integrating deposited prepreg pieces by heating, only molten matrix resin flows into the gaps between the deposited prepreg pieces. Therefore, in the fiber-reinforced plastic thus obtained, locally resin-rich portions are generated. Due to the effect of these resin-rich portions, a fiber-reinforced plastic obtainable by this method has a problem of inferior heat resistance.

Methods in which plural sheets of a prepreg substrate obtained by impregnating reinforcing fibers that are unidirectionally arranged in parallel with a thermoplastic resin and forming slits therein such that the slits intersect the fiber axes, are laminated and integrated to obtain a fiber-reinforced plastic, have also been disclosed (Patent Documents 2 to 6). In a fiber-reinforced plastic obtainable by this method, since slits are formed in the prepreg substrate and split the reinforcing fibers, satisfactory fluidity may be obtained at the time of shaping. Furthermore, when plural sheets of a prepreg substrate are laminated such that the fiber axial directions of the reinforcing fibers are not biased in a particular direction, for example, such that the fiber axial directions are shifted by 45° each when viewed in a planar view, a fiber-reinforced plastic having mechanical properties that are satisfactorily isotropic and have less variation can be obtained. Furthermore, anisotropy can be controlled by aligning the fiber axial directions in an arbitrary direction and laminating the plural sheets of prepreg substrate.

However, a fiber-reinforced plastic obtainable by this method has a problem that in a case in which stress occurs in a direction that follows the slit shape, these slit parts serve as the starting points of breakage, and mechanical properties deteriorate. Furthermore, since substantially only the resin exists in these slit parts, at a temperature higher than or equal to the glass transition temperature of the matrix resin, the fiber-reinforced plastic has a problem of inferior heat resistance, similarly to the method disclosed in Patent Document 1.

Furthermore, in this method, in a case in which a band-shaped fiber-reinforced plastic having satisfactorily isotropic mechanical properties is continuously produced, it is necessary to separately produce band-shaped prepreg substrates having fiber axial directions of the reinforcing fibers that are different from each other when viewed in a planar view (for example, 0°, 45°, 90°, and −45° with respect to the length direction), and to laminate those prepreg substrates. Therefore, the production process becomes complicated, with difficulty in control, and the production cost increases.

Furthermore, even in a case in which sheets of a fiber-reinforced plastic are produced, the sheets need to be laminated while the respective prepreg substrate sheets are frequently rotated at predetermined angles of rotation (0°, 45°, 90°, and −45°) so that the fiber axial directions of the reinforcing fibers are not biased when viewed in a planar view. Therefore, similarly in this case, the lamination operation becomes complicated, with difficulty in control, and the production cost increases.

Patent Document 7 discloses a method for producing a fiber-reinforced plastic by dispersing reinforcing fibers by a papermaking process. In a fiber-reinforced plastic obtainable by this method, since the reinforcing fibers are almost uniformly dispersed, the fiber-reinforced plastic has excellent isotropic mechanical properties with less variation, and also has satisfactory heat resistance.

However, in a fiber-reinforced plastic obtainable by this method, since the reinforcing fibers are three-dimensionally entangled, fluidity at the time of shaping is very poor. Furthermore, the production process is also very complicated, and is markedly disadvantageous in terms of cost. In addition, in a case in which it is attempted to produce a fiber-reinforced plastic having a high percentage content of reinforcing fibers by this method, it is necessary to perform papermaking in a state in which the reinforcing fibers are more densely incorporated. However, when it is intended to impregnate reinforcing fibers that are subjected to papermaking at a high density as such with a matrix resin, since reinforcing fibers that are oriented in the thickness direction (direction of impregnation) in particular, among the reinforcing fibers that are three-dimensionally entangled, cope with the stress of the pressing force at the time of impregnation, pressure is not transferred to the resin, and it is very difficult to achieve impregnation. Furthermore, even in a case in which the fiber length of the reinforcing fibers is long, since three-dimensional entanglement becomes strong, similarly impregnation becomes difficult.

CITATION LIST

Patent Document

Patent Document 1: JP 07-164439 A
Patent Document 2: JP 63-247012 A
Patent Document 3: JP 63-267523 A
Patent Document 4: JP 2008-207544 A
Patent Document 5: JP 2008-207545 A
Patent Document 6: JP 2009-286817 A
Patent Document 7: WO 2010/013645 A

SUMMARY OF THE INVENTION

Problem to be Solved by the Invention

It is an object of the present invention to provide a fiber-reinforced plastic which exhibits controllable isotropy or anisotropy in the mechanical properties, has excellent mechanical characteristics with less variation, excellent heat resistance, and satisfactory fluidity at the time of shaping. Furthermore, it is another object of the invention to provide a method for producing a fiber-reinforced plastic, by which the fiber-reinforced plastic can be produced conveniently at low cost.

Means for Solving Problem

The inventors of the present invention conducted a thorough investigation in order to solve the problems described above, and as a result, the inventors found that the present invention can be solved by the following items (1) to (15), thus solving the present invention.

(1) A method for producing a fiber-reinforced plastic, the method including the following Steps (i) to (iii):

(i) a step of obtaining material (A) including a prepreg substrate in which reinforcing fibers that are unidirectionally arranged in parallel are impregnated with a matrix resin, and slits are formed so as to intersect the fiber axes;

(ii) a step of pressing material (A) using a pressing apparatus that applies pressure approximately uniformly in a direction orthogonal to the travel direction of the material (A), while causing the material (A) to travel in one direction, with the angles θ formed by the fiber axial directions of the reinforcing fibers of the prepreg substrate with respect to the above-mentioned orthogonal direction being adjusted to −20° to 20°, in a state in which the material (A) is heated to a temperature T that is higher than or equal to the melting point of the matrix resin, or is higher than or equal to the glass transition temperature if the matrix resin does not have a melting point; and (iii) a step of cooling the material (A) that has been pressed by the pressing apparatus, and thereby obtaining a fiber-reinforced plastic.

(2) The method for producing a fiber-reinforced plastic according to (1), wherein Step (ii) described above is the following Step (ii-1):

(ii-1) a step of pressing the material (A) in a state of being heated to the temperature T, while causing the material (A) to travel in one direction, using a pressing apparatus which includes at least a pair of press rolls, with the shaft line direction of the rolls forming the orthogonal direction described above.

(3) The method for producing a fiber-reinforced plastic according to (2), wherein heating rolls are used as the press rolls in the Step (ii-1).

(4) The method for producing a fiber-reinforced plastic according to any one of (1) to (3), wherein the angles θ are adjusted to −5° to 5°.

(5) The method for producing a fiber-reinforced plastic according to any one of (1) to (4), wherein the thickness of the prepreg laminate is 0.25 mm to 6.0 mm.

(6) The method for producing a fiber-reinforced plastic according to any one of (1) to (5), wherein the matrix resin is a thermoplastic resin.

(7) The method for producing a fiber-reinforced plastic according to any one of (1) to (5), wherein the matrix resin includes at least one selected from the group consisting of a polyolefin resin, a modified polypropylene resin, a polyamide resin, and a polycarbonate resin.

(8) The method for producing a fiber-reinforced plastic according to any one of (1) to (7) wherein the length L of the reinforcing fibers cut by the slits in the prepreg substrate is 1 mm to 100 mm.

(9) The method for producing a fiber-reinforced plastic according to any one of (2) to (8), wherein in the Step (ii-1), a double belt-type heat press machine by which the material (A) is interposed between at least one pair of belts and is heated while the material (A) is caused to travel so as to pass through between at least one pair of press rolls, and the material (A) is pressed by the at least one pair of press rolls, is used.

(10) A fiber-reinforced plastic including carbon fibers and a matrix resin, in which the fiber length of the carbon fibers is 1 mm to 100 mm, the degree of orientation pf of the carbon fibers in a direction orthogonally intersecting the thickness direction is 0.001 to 0.8, and the eccentricity coefficient ec of the orientation profile of the carbon fibers in a plane orthogonally intersecting the thickness direction is $1 \times 10^{-5}$ to $9 \times 10^{-5}$.

(11) The fiber-reinforced plastic according to (10), wherein the dispersion parameter dp of the carbon fibers in a cross-section in the thickness direction is 100 to 80.

(12) The fiber-reinforced plastic according to (10) or (11), wherein the matrix resin is formed from a thermoplastic resin.

(13) The fiber-reinforced plastic according to any one of (10) to (12), wherein the fiber volume percentage content of the carbon fibers is 5% to 70% by volume.

(14) The fiber-reinforced plastic according to any one of (10) to (13), wherein the fiber length of the carbon fibers is 10 mm to 50 mm.

(15) The fiber-reinforced plastic according to any one of (10) to (14), wherein the thickness of the carbon fiber-reinforced plastic is 0.25 mm to 6.0 mm.

Effect of the Invention

The fiber-reinforced plastic of the present invention exhibits controllable isotropy or anisotropy in the mechanical properties, has excellent mechanical characteristics with less variation, has excellent heat resistance, and also has satisfactory fluidity at the time of shaping.

According to the method for producing a fiber-reinforced plastic of the present invention, a fiber-reinforced plastic which exhibits controllable isotropy or anisotropy in the mechanical characteristics, has excellent mechanical characteristics with less variation, has excellent heat resistance, and has satisfactory fluidity at the time of shaping, can be produced conveniently at low cost.

MODE(S) FOR CARRYING OUT THE INVENTION

Figure 1:
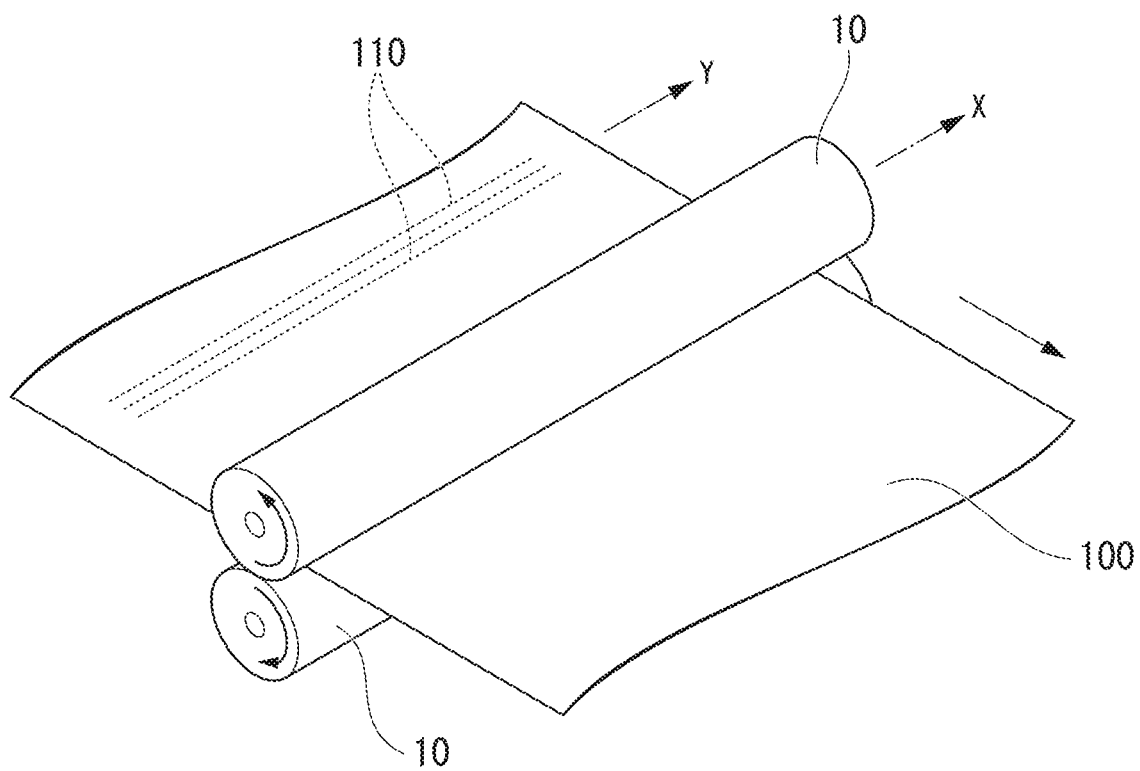
FIG. 1 is a perspective view diagram illustrating the operation of pressing material (A) with a pair of press rolls.

According to the present specification, the angle θ formed by the fiber axial direction of a reinforcing fiber of the prepreg substrate with respect to the travel direction of the material (A), is the angle formed by a direction orthogonal to the travel direction of the material (A) when the relevant material (A) is pressed while being caused to travel in Step (ii), as well as the fiber axial direction of a reinforcing fiber of the prepreg substrate in the relevant material (A). In regard to the angle θ, an angle resulting from counterclockwise rotation when the material (A) is viewed from the above is considered to have a positive value, and an angle resulting from clockwise rotation is considered to have a negative value.

In a case in which a pressing apparatus equipped with at least a pair of press rolls, the shaft line direction of rolls being coincident with a direction orthogonal to the travel direction of the material (A), is used as the pressing apparatus in Step (ii), the angle θ is coincident with the angle formed by the shaft line direction of the press rolls and the fiber axial direction of reinforcing fibers of the prepreg substrate in the material (A).

<Method for Producing Fiber-Reinforced Plastic>

The method for producing a fiber-reinforced plastic of the present invention is a method including the following Steps (i) to (iii):

(i) a step of obtaining material (A) including a prepreg substrate in which reinforcing fibers that are unidirectionally arranged in parallel are impregnated with a matrix resin, and slits are formed so as to intersect the fiber axes;

(ii) a step of pressing the material (A) using a pressing apparatus that approximately uniformly presses the material (A) in a direction orthogonal to the travel direction of the material (A), while causing the material (A) to travel in one direction, with the angles θ formed by the fiber axial directions of the reinforcing fibers of the prepreg substrate with respect to the orthogonal direction being adjusted to −20° to 20°, in a state in which the material (A) is heated to a temperature T that is higher than or equal to the inciting point of the matrix resin, or is higher than or equal to the glass transition temperature if the matrix resin does not have a melting point; and (iii) a step of cooling the material (A) that has been pressed by the pressing apparatus, and thereby obtaining a fiber-reinforced plastic.

[Step (i)]

In Step (i), material (A) that includes a prepreg substrate is obtained. Material (A) may be a single layer material formed from one sheet of a prepreg substrate only, or may be a prepreg laminate obtained by laminating two or more sheets of a prepreg substrate.

(Prepreg Substrate)

The prepreg substrate used in Step (i) is a product in which reinforcing fibers that are unidirectionally arranged in parallel are impregnated with a matrix resin.

The reinforcing fibers are not particularly limited, and for example, inorganic fibers, organic fibers, metal fibers, or reinforcing fibers having a hybrid configuration of combining the foregoing fibers can be used.

Examples of the inorganic fibers include carbon fibers, graphite fibers, silicon carbide fibers, alumina fibers, tungsten carbide fibers, boron fibers, and glass fibers. Examples of the organic fibers include aramid fibers, high density polyethylene fibers, other general nylon fibers, and polyester fibers. Examples of the metal fibers include fibers of stainless steel and iron, and carbon fibers coated with metals may also be used. Among these, when mechanical properties such as strength of the structural material as a final molded product are considered, carbon fibers are preferred.

The carbon fibers are not particularly limited, and examples thereof include polyacrylonitrile (PAN)-based carbon fibers and PICH-based carbon fibers.

Preferred carbon fibers are carbon fibers having a strand tensile strength of from 1.0 GPa to 9.0 GPa as measured according to JIS R7601 (1986) and a strand tensile modulus of from 150 GPa to 1,000 GPa.

More preferred carbon fibers are carbon fibers having a strand tensile strength of from 1.5 GPa to 9.0 GPa as measured according to JIS R7601 (1986) and a strand tensile modulus of from 200 GPa to 1,000 GPa.

The average fiber diameter of the reinforcing fibers is preferably 1 μm to 50 μm, and more preferably 5 μm to 20 μm.

The matrix resin may be a thermoplastic resin, or may be a thermosetting resin. Regarding the matrix resin, one kind may be used alone, or two or more kinds may be used in combination.

The matrix resin is preferably a thermoplastic resin. Since thermoplastic resins generally having higher toughness values than thermosetting resins, when a prepreg substrate impregnated with a thermoplastic resin as the matrix resin is used, a structural material having excellent strength, particularly excellent impact resistance, is easily obtained. Furthermore, in regard to thermoplastic resins, since the shape is determined by cooling solidification without being accompanied by a chemical reaction, in the case of using the relevant prepreg substrate, molding can be achieved in a short time period, and excellent productivity is obtained.

The thermoplastic resin is not particularly limited, and examples thereof include a polyamide resin (nylon 6 (melting point: 220° C.), nylon 66 (melting point: 260° C.), nylon 12 (melting point: 175° C.), nylon MXD6 (melting point: 237° C.), or the like), a polyolefin resin (low density polyethylene (melting point: 95° C. to 130° C.), high density polyethylene (melting point: 120° C. to 140° C.), polypropylene (melting point: 168° C.), or the like), a modified polyolefin resin (modified polypropylene resin (melting point: 160° C. to 165° C.), or the like), a polyester resin (polyethylene terephthalate, polybutylene terephthalate, or the like), a polycarbonate resin (glass transition temperature: 145° C.), a polyamideimide resin, a polyphenylene oxide resin, a polysulfone resin, a polyether sulfone resin, a polyether ether ketone resin, a polyetherimide resin, a polystyrene resin, an ABS resin, a polyphenylene sulfide resin, a liquid crystal polyester resin, a copolymer of acrylonitrile and styrene, and a copolymer of nylon 6 and nylon 66.

Examples of the modified polyolefin resin include resins obtained by modifying polyolefin resins with acids such as maleic acid.

The thermoplastic resins may be used singly or in combination of two or more kinds thereof.

It is preferable that the thermoplastic resin includes at least one selected from the group consisting of a polyolefin resin, a modified polypropylene resin, a polyamide resin, and a polycarbonate resin, from the viewpoint of the balance between adhesiveness of the reinforcing fibers, impregnability into the reinforcing fibers, and the raw material cost of the thermoplastic resin.

The thermosetting resin is not particularly limited, and examples thereof include an epoxy resin, a phenolic resin, an unsaturated polyester resin, a urethane-based resin, a ureal resin, a melamine resin, and an imide-based resin.

The thermosetting resins may be used singly or in combination of two or more kinds thereof.

The thermosetting resin is preferably an epoxy resin, a phenolic resin, an unsaturated polyester resin, or an imide-based resin from the viewpoint of the manifestability of mechanical characteristics of the fiber-reinforced plastic after the thermosetting resin is cured, and the thermosetting resin is more preferably an epoxy resin or an unsaturated polyester resin from the viewpoint of the ease of production of the prepreg substrate.

In the prepreg substrate, additives such as a flame retardant, a weather resistance improving agent, an antioxidant, a thermal stabilizer, an ultraviolet absorber, a plasticizer, a lubricating agent, a colorant, a compatibilizer, and an electroconductive filler may be included according to the required characteristics of the intended structural material.

Furthermore, in the prepreg substrate used in Step (i), slits are formed so as to intersect the fiber axes. Thereby, the relevant prepreg substrate is in a state in which reinforcing fibers having a long fiber length, which are unidirectionally arranged in parallel, are split by the slits.

Generally, as the reinforcing fibers are longer, a structural material having superior mechanical properties is obtained; however, since fluidity is decreased particularly at the time of stamping molding, it becomes difficult to obtain a structural material having a complicated three-dimensional shape. In the present invention, since the reinforcing fibers are cut and shortened by inserting slits into the prepreg substrate, the reinforcing fibers and the matrix resin may easily flow even at the time of stamping molding. Therefore, it is also easy to obtain a structural material having a complicated three-dimensional shape such as a rib or a boss.

Furthermore, when a sheet-like fiber-reinforced plastic is formed by dispersing prepreg pieces cut out from a prepreg substrate, which are generally called random materials, and integrating the prepreg pieces, variation occurs in the mechanical properties, and therefore, component design is not feasible. In this regard, since a fiber-reinforced plastic is obtained using a slit-inserted prepreg substrate in the present invention, satisfactory mechanical properties are obtained as compared to the case of using random materials, and variation thereof can also be made smaller.

The shape of the slits formed in the prepreg substrate is not particularly limited, and for example, the slit shape may be a straight line shape, a curved line shape, or a broken line shape.

The angle of the slits formed in the prepreg substrate with respect to the fiber axis of a reinforcing fiber is also not particularly limited.

The length L of the reinforcing fibers that have been cut by slits in the prepreg substrate are preferably 1 mm to 100 mm, more preferably 3 mm to 70 min, even more preferably 5 mm to 50 mm, particularly preferably 10 mm to 50 mm, and most preferably 10 mm to 35 mm. When the length L of the reinforcing fibers is more than or equal to the lower limit, a fiber-reinforced plastic having sufficient mechanical properties may be easily obtained. When the length L of the reinforcing fibers is less than or equal to the upper limit, since the reinforcing fibers and the matrix resin become easily flowable at the time of molding, it is easy to shape the fiber-reinforced plastic thus obtained into a structural material having a complicated three-dimensional shape such as a rib.

The fiber volume percentage content (Vf) in the prepreg substrate is preferably 5% to 70% by volume, more preferably 10% to 60% by volume, and even more preferably 15% to 50% by volume. When the Vf is more than or equal to the lower limit, a structural material having sufficient mechanical properties may be easily obtained. When the Vf is less than or equal to the upper limit, satisfactory fluidity may be easily obtained at the time of shaping.

Meanwhile, the Vf value of a prepreg substrate means the proportion of the volume of reinforcing fibers with respect to the total volume of reinforcing fibers, a matrix resin, and other components such as additives, excluding voids (gas), in the prepreg substrate. Since the Vf value measured according to JIS K7075 is a value that varies depending on the existing amount of voids in the prepreg substrate, in the present invention, a fiber volume percentage content that does not depend on the existing amount of voids is employed.

The thickness of the prepreg substrate is preferably 50 μm to 500 μm. When the thickness of the prepreg substrate is more than or equal to the lower limit, handling of the prepreg substrate is facilitated. Furthermore, in the case of obtaining material (A) having a desired thickness by laminating two or more sheets of a prepreg substrate, since the number of laminated sheets of the prepreg substrate becoming too large can be prevented, productivity is increased. When the thickness of the prepreg substrate is less than or equal to the upper limit, voids (pores) inside the prepreg substrate that are generated at the time of production of the prepreg substrate, can be suppressed, and a fiber-reinforced plastic having sufficient mechanical properties may be easily obtained.

According to the present invention, the effect of the thickness of the prepreg substrate on the strength of the structural material that is finally obtainable is small.

The method for producing a prepreg substrate is not particularly limited, and any known method can be employed. Regarding the prepreg substrate, any commercially available prepreg substrate may be used.

Regarding the method for forming slits in the prepreg substrate, for example, methods of using a laser marker, a cutting plotter, a punching die, and the like may be used. A method of using a laser marker is preferable from the viewpoint that even slits having complicated shapes such as a curve line shape and a zigzag line shape can be processed at high speed. A method of using a cutting plotter is preferable from the viewpoint that processing is easily achieved even with a large-sized prepreg substrate having a length of 2 m or more. A method of using a punching die is preferable from the viewpoint that processing can be achieved at high speed.

In a case in which the material (A) is constituted from a prepreg laminate, in regard to the prepreg laminate, it is preferable to form a resin layer by laminating a resin sheet between the prepreg substrate sheets to be laminated. Thereby, fluidity is increased in Step (ii), the isotropy or anisotropy of mechanical properties is controlled, and a fiber-reinforced plastic having less variation in the mechanical properties can be easily obtained.

The resin that is used in the resin layer described above is not particularly limited, and for example, the same resin as the matrix resin used in the prepreg substrate may be used. It is preferable that the matrix resin used in the resin layer is a resin that is identical with the matrix resin used in the prepreg substrate. Meanwhile, it is still acceptable if the resin used in the resin layer is a resin that is different from the matrix resin used in the prepreg substrate.

(Modes of Lamination)

In a case in which the material (A) is constituted from a prepreg laminate, the mode in which prepreg substrate sheets are laminated in Step (i) is desirably a mode in which the conditions for the angle θ in Step (ii) are satisfied in 66% or more of the prepreg substrate sheets with respect to the number of laminated sheets of the prepreg substrate in the prepreg laminate to be formed. That is, lamination may be performed by shifting the fiber axial directions of the reinforcing fibers of the prepreg substrate in a particular range such that the conditions for the angle θ in Step (ii) are satisfied in 66% or more of the various prepreg substrate sheets with respect to the number of laminated sheets. In a case in which the prepreg laminate includes prepreg substrate sheets that do not satisfy the above-described conditions for the angle θ at a proportion of less than 34% relative to the number of laminated sheets, the fiber axial directions of the reinforcing fibers in the prepreg substrate are not particularly limited. In regard to the prepreg laminate, it is preferable that the conditions for the angle θ are satisfied in all of the prepreg substrate sheets.

Specifically, for example, a mode in which two or more sheets of a prepreg substrate are aligned such that the fiber axes of the reinforcing fibers of the various prepreg substrate sheets are arranged in the same direction, and then the prepreg substrate sheets are laminated, may be employed. Since the fiber axial directions of the reinforcing fibers of the various prepreg substrate sheets are aligned in this mode, it is easy to control the angle relations between the travel direction of the material (A) and the fiber axial directions of the reinforcing fibers of the various prepreg substrate sheets such that the conditions for the angel θ are satisfied in the various prepreg substrate sheets in Step (ii).

Furthermore, as long as the conditions for the angle θ in Step (ii) are substantially satisfied in each of the prepreg substrate sheets of the prepreg laminate, a mode in which the fiber axial directions of the reinforcing fibers in the various prepreg substrate sheets that have been laminated are deviated from one another, is still acceptable. That is, when prepreg substrate sheets are laminated, strictly controlling the angles of the various prepreg substrate sheets so as to completely align the fiber axial directions of the reinforcing fibers of the various prepreg substrate sheets, is not necessarily essential.

Furthermore, even in a case in which there are deviations in the fiber axial directions of the reinforcing fibers between the various prepreg substrate sheets thus laminated, the deviation in the fiber axial directions of the reinforcing fibers between the various prepreg substrate sheets that satisfy the conditions for the angle θ of 66% or more with respect to the number of laminated sheets in the prepreg laminate thus formed, is 40° or less, and preferably 10° or less. As the deviations in the fiber axial directions of the reinforcing fibers between the various prepreg substrate sheets that satisfy the conditions for the angle θ are smaller, it becomes easier to control the angle relations between the travel direction of the material (A) and the fiber axial directions of the reinforcing fibers of the various prepreg substrate sheets so as to satisfy the conditions for the angle θ in the various prepreg substrate sheets in Step (ii).

The number of laminations of the prepreg substrate in the prepreg laminate is preferably 2 to 16, and more preferably 4 to 12. When the number of laminations of the prepreg substrate is more than or equal to the lower limit, a fiber-reinforced plastic having sufficient mechanical properties may be easily obtained. When the number of laminations of the prepreg substrate is less than or equal to the upper limit, the laminating operation is facilitated, and excellent productivity is obtained.

The thickness of the material (A) is preferably 0.25 mm to 6.0 mm, more preferably 0.4 mm to 6.0 mm, and even more preferably 0.6 mm to 4.0 mm. When the thickness of the material is more than or equal to the lower limit, a fiber-reinforced plastic having sufficient mechanical properties may be easily obtained. When the thickness of the material (A) is less than or equal to the upper limit, the fiber axial directions of the reinforcing fibers in the material (A) are more easily randomized due to the pressing in Step (ii) as will be described below, and a fiber-reinforced plastic which exhibits easily controllable isotropy or anisotropy in the mechanical properties and has less variation in the mechanical properties, may be easily obtained.

[Step (ii)]

In Step (ii), the material (A) is pressed using a pressing apparatus that can press the material (A) in the thickness direction such that pressing is achieved approximately uniformly in a direction orthogonal to the travel direction of the material (A), while the material (A) is caused to travel in one direction, in a state in which the material (A) is heated to a temperature T that is higher than or equal to the melting point of the matrix resin, or is higher than or equal to the glass transition temperature if the matrix resin does not have a melting point.

In Step (ii), the angles θ formed by the fiber axial directions of the reinforcing fibers of the prepreg substrate in the material (A) with respect to a direction orthogonal to the travel direction of the material (A), are adjusted to −20° to 20° at the time of pressing by the pressing apparatus. When a prepreg laminate is used as the material (A), even in a case in which the fiber axial directions of the reinforcing fibers between various prepreg substrate sheets are shifted from one another, the conditions for the angle θ described above should be satisfied in 66% or more of the prepreg substrate sheets with respect to the number of laminated sheets.

When the material (A) is pressed with a pressing apparatus as described above in a state in which the matrix resin is incited by heating the material (A) to the temperature T, the reinforcing fibers that have been cut by the slits flow together with the matrix resin, and the fiber axial directions of the reinforcing fibers change to various directions. Thereby, the fiber axial directions of the reinforcing fibers that have been aligned in an identical direction in the material (A) are randomized, and a fiber-reinforced plastic which exhibits easily controllable isotropy or anisotropy in the mechanical properties and has less variation in the mechanical properties, can be obtained.

The angles θ are preferably −5° to 5°. When the angles θ are in the range described above, the fiber axial directions of the reinforcing fibers in the material (A) may be randomized more easily by pressing with press rolls, and a fiber-reinforced plastic which exhibits controllable isotropy or anisotropy in the mechanical properties and has less variation in the mechanical properties, may be easily obtained.

Temperature T is a temperature higher than or equal to the melting point of the matrix resin impregnated in the prepreg substrate, or a temperature higher than or equal to the glass transition temperature of the matrix resin if the matrix resin does not have a melting point. In a case in which the material (A) includes two or more kinds of matrix resins, the temperature T is to be based on the highest temperature among the melting points or glass transition temperatures of those matrix resins.

The temperature T may vary depending on the kind of the matrix resin; however, in the range in which the matrix resin melts, the temperature T is preferably 150° C. to 450° C., and more preferably 200° C. to 400° C. When the temperature T is in the range described above, the reinforcing fibers and the matrix resin may be easily flowed, and a fiber-reinforced plastic which exhibits controllable isotropy or anisotropy in the mechanical properties and has less variation in the mechanical properties, may be easily obtained.

In Step (ii), the material (A) may be preheated before the material (A) is heated to the temperature T. In the case of performing preheating, the preheating temperature is preferably 150° C. to 400° C., and more preferably 200° C. to 380° C. In the stage of preheating, the matrix resin of the material (A) may be in a molten state, or may not be in a molten state.

The method for preheating the material (A) is not particularly limited, and examples include methods of using an IR heater, a hot air circulating oven, and the like.

The linear pressure employed at the time of pressing the material (A) is preferably 3 N/m to 100 N/m, and more preferably 5 N/m to 50 N/m. When the linear pressure is in the range described above, a fiber-reinforced plastic which exhibits controllable isotropy or anisotropy in the mechanical properties and has less variation in the mechanical properties, may be easily obtained.

The time for pressing the material (A) is preferably 0.1 minutes to 30 minutes, and more preferably 0.5 minutes to 10 minutes. The pressing time can be regulated by the travel speed of the material (A), and in the case of using a pressing apparatus having press rolls as will be described below, the pressing time can be regulated by the number of pairs of the press rolls used.

The travel speed of the material (A) in Step (ii) is preferably 0.1 m/min to 25 m/min, more preferably 0.2 m/min to 20 m/min, and even more preferably 0.5 m/min to 15 m/min. When the travel speed of the material (A) is more than or equal to the lower limit, productivity is increased. When the travel speed of the material (A) is less than or equal to the upper limit, a fiber-reinforced plastic which exhibits controllable isotropy or anisotropy in the mechanical properties and has less variation in the mechanical properties, may be easily obtained.

When the linear pressure, the pressing time, and temperature T are controlled at the time of pressing the material (A) in Step (ii), the mechanical properties of the fiber-reinforced plastic thus obtainable can have excellent isotropy, and also, anisotropy of the mechanical properties can be controlled as desired.

Regarding Step (ii), Step (ii-1) in which material (A) is pressed in a state of being heated to temperature T while being caused to travel in one direction, by means of a pressing apparatus equipped with at least a pair of press rolls whose shaft line direction is a direction orthogonal to the travel direction of the material (A), is preferred.

In Step (ii-1), as illustrated in FIG. 1, the shaft line direction of a pair of press rolls 10 is coincident with a direction orthogonal to the travel direction of the material (A). Material (A) 100 is pressed in a state of being heated to temperature T while being caused to travel in one direction, using the pair of press rolls 10. At this time, pressing of the material (A) is performed such that the angles θ formed by the directions Y of the fiber axes of reinforcing fibers 110 of the prepreg substrate in the material (A) 100 with respect to direction X that is orthogonal to the travel direction of the material (A), are in the range of −20° to 20°.

In regard to the pair of press rolls, the shaft line directions of upper press rolls and lower press rolls are coincident.

Regarding the method of heating the material (A) to temperature T in Step (ii-1), a method of pressing the material (A) while heating using heated rolls as the press rolls.

When a state in which the material (A) is heated to the temperature T when pressed with press rolls can be secured by simply heating the material (A) before pressing, press rolls that do not have a heating function may be used. Furthermore, in a case in which the material (A) can be heated to the temperature T only by using heated rolls that are used as press rolls, preheating may not be performed.

In Step (ii-1), only a pair of press rolls in a single row may be used, or two or more pairs of press rolls in two or more rows may also be used. In a case in which vertically pairing press rolls are provided in two or more rows in Step (ii-1), the angles θ are adjusted to −20° to 20° for all of the press rolls.

In Step (ii-1), it is preferable to use a double belt-type heat press machine that interposes material (A) with at least a pair of belts, heats the material (A) while causing the material (A) to travel so as to pass through between at least a pair of press rolls, and presses the material (A) with at least the pair of press rolls. In this case, it is preferable to dispose release paper or release film between the material (A) and the belts, or to have the belt surfaces subjected in advance to a release treatment. The material for the belt is not particularly limited, and from the viewpoints of heat resistance and durability, belts made of metals are preferred.

Meanwhile, Step (ii-1) is not intended to be limited to the mode of carrying out the process using a double belt-type heat press machine. For example, a mode in which a band-shaped material (A) is pressed with a pair of press rolls while the material (A) is caused to travel without being interposed between a pair of belts, may also be employed.

Step (ii) is not limited to the mode of using a pressing apparatus equipped with at least a pair of press rolls. For example, a mode of performing pressing using a pressing apparatus that presses with a flat surface and a press roll; a pressing apparatus based on pressing plates that presses with a flat surface and a flat surface; or a pressing apparatus equipped with plural spherical presses, may also be used.

[Step (iii)]

In Step (iii), a fiber-reinforced plastic is obtained by cooling the material (A) that has been pressed with a pressing apparatus in Step (ii). In a case in which the matrix resin is a thermoplastic resin, a fiber-reinforced plastic is obtained by lowering the temperature of the material (A) to a temperature below the melting point or the glass transition temperature of the thermoplastic resin and thereby solidifying the material (A).

In the case of using a prepreg laminate as the material (A), the fiber-reinforced plastic thus obtainable is in the form of a sheet in which various prepreg substrate sheets are adhered and integrated. Therefore, even in the case of using a prepreg laminate, the fiber-reinforced plastic thus obtainable can be easily handled.

The method for cooling the material (A) is not particularly limited, and for example, a method of using warm water rolls may be used. A method of cooling by naturally cooling the material (A) may also be employed.

The cooling time is preferably 0.5 minutes to 30 minutes.

[Example of embodiments]

In the following description, an example of using a double belt-type heat press machine 1 illustrated in FIG. 2 (hereinafter, simply referred to as heat press machine 1) will be explained as an example of an embodiment of carrying out Step (ii-1) and Step (iii). Meanwhile, the embodiment of carrying out Step (ii) and Step (iii) is not limited to the embodiment of using the heat press machine 1.

The heat press machine 1 has a pair of belts 12 that cause a band-shaped material (A) 100 to travel in one direction in a state of having the material (A) vertically interposed therebetween; a pair of IR heaters 14 that preheat the material (A); three pairs of press rolls 10 in three rows, which vertically interpose the preheated material (A) 100 and press the material (A) 100; three pairs of warm water rolls 16 in three rows, which vertically interpose the pressed material (A) 100 and cool the material (A) 100; and a winding roll 18 that winds a fiber-reinforced plastic 120 that has been cooled and solidified, thus having various prepreg substrate sheets integrated together.

A pair of press rolls 10 press the material (A) 100 while moving rotationally in the direction in which the material (A) 100 that passes through between the press rolls is sent to the downstream side. A pair of warm water rolls cool the material (A) 100 while moving rotationally in the direction in which the material (A) 100 that passes through the warm water rolls is sent to the downstream side.

A pair of belts 12 are each mounted to rotate by means of a driving roll 20 provided on the upstream side of the IR heaters 14, and a driven roll 22 provided on the downstream side of the warm water rolls 16, and each belt is moved rotationally by the driving roll 20. The material (A) 100 is caused to travel as the pair of belts 12 move rotationally in a state of having the material (A) 100 interposed therebetween.

In the mode of using this heat press machine 1, as Step (ii-1), a band-shaped material (A) 100 is continuously supplied to the heat press machine 1 such that the angles formed by the fiber axial directions of the reinforcing fibers in the material (A) 100 with respect to the shaft line direction of the rolls are in the range of −20° to 20°. Specifically, a band-shaped material (A) 100 in which the fiber axial directions of the reinforcing fibers are at −20° to 20° with respect to a direction orthogonal to the travel direction, is continuously supplied in the length direction to the heat press machine 1. In the heat press machine 1, since the shaft line direction of the pair of press rolls 10 is coincident with the direction orthogonal to the travel direction of the material (A) 100 thus supplied, the angles are in the range of −20° to 20°.

Inside the heat press machine 1, the material (A) 100 is preheated by the IR heaters 14 while being caused to travel so as to pass through between the pair of press rolls 10 in a state of being interposed between the pair of belts 12, and the material (A) 100 is pressed in a state of being heated to temperature T by the press rolls 10. Thereby, the matrix resin and the reinforcing fibers in the material (A) 100 are fluidized, and the fiber axial directions of the reinforcing fibers are randomized.

In this example, it is preferable to perform pressing of the material (A) 100 simultaneously with heating to temperature T, using heated rolls as the press rolls 10. Meanwhile, in a case in which the material (A) 100 can be pressed by the press rolls 10 in a state of being heated to temperature T only by preheating with the IR heaters 14, the material (A) 100 may be simply pressed without being heated upon passing through between the press rolls 10.

Next, as Step (iii), the material (A) 100 that has been pressed by the press rolls 10 is caused to travel so as to pass through between the pair of warm water rolls 16 in a state of being interposed between the pair of belts 12, and is cooled by the warm water rolls 16. Thereby, a band-shaped fiber-reinforced plastic 120 is obtained.

The fiber-reinforced plastic 120 thus obtained is detached from the pair of belts 12 on the downstream side of the driven rolls 22, and then is wound around a winding roll 18 via a guide roll 24.

A double belt-type heat press machine such as the heat press machine 1 is advantageous from the viewpoint that a series of processes including heating, pressing, and cooling of the material (A) can be carried out conveniently.

[Operating Effect]

In the production method of the present invention described above, when the angles θ are controlled to a particular range, and the material (A) is pressed using a particular pressing apparatus in Step (ii), the reinforcing fibers are fluidized, and the fiber axial directions are randomized. Thereby, a fiber-reinforced plastic which has excellent mechanical properties such as strength, has the isotropy or anisotropy of the mechanical properties well-controlled, has less variation, and also has excellent heat resistance, can be obtained. Therefore, when a fiber-reinforced plastic obtained by the production method of the present invention is shaped, a structural material which has excellent mechanical properties, has the isotropy or anisotropy of the mechanical properties well-controlled, has less variation, and has excellent heat resistance, can be produced.

As such, according to the method of the present invention, a fiber-reinforced plastic which has excellent mechanical properties, has the isotropy or anisotropy of the mechanical properties well-controlled, has less variation, and also has excellent heat resistance, can be produced using a material (A) in which the fiber axial directions of the reinforcing fibers of the prepreg substrate are biased in a particular range. Therefore, in a case in which a band-shaped fiber-reinforced plastic is continuously produced, it is not necessary to respectively produce prepreg substrates having different fiber axial directions of the reinforcing fibers, and production is convenient and advantageous in view of cost. Also, in the case of producing sheets of a fiber-reinforced plastic, laminating the fiber-reinforced plastic sheets while various prepreg substrate sheets are frequently rotated at predetermined angles of rotation so that the fiber axial directions of the reinforcing fibers are not biased, is not necessary. Therefore, even in the case of using a prepreg laminate, the lamination operation is convenient and easily controllable, and it is also advantageous in view of cost.

Furthermore, in the fiber-reinforced plastic obtainable by the production method of the present invention, since the reinforcing fibers are cut by the slits formed in the prepreg substrate, the fiber-reinforced plastic has high fluidity at the time of shaping, and can be suitably used for the production of a structural material having a complicated shape such as a three-dimensional shape.

The production method of the present invention is not limited to the method of using the heat press machine 1 as described above. For example, a method for producing sheets of fiber-reinforced plastic by supplying sheets of the material (A) to a double belt-type heat press machine may also be used.

Furthermore, a method in which preheating of the material (A) is not performed in Step (ii-1) may also be used. Also, a method of using a double belt-type heat press machine equipped with two or more pairs of belts may also be used. In a case in which a band-shaped fiber-reinforced plastic is produced continuously, or the like, a method of performing Step (ii-1) and Step (iii) while causing the band-shaped material (A) to travel as received without being interposed between belts, may also be used. Furthermore, a method of separately using an apparatus exclusive for preheating, an apparatus exclusive for pressing, and an apparatus exclusive for cooling, may also be used.

<Fiber-Reinforced Plastic>

A fiber-reinforced plastic that uses carbon fibers as reinforcing fibers (hereinafter, also referred to as carbon fiber-reinforced plastic), which is obtainable by the production method of the present invention, is preferable from the viewpoint of having more satisfactory mechanical characteristics, having much less variation, having more satisfactory heat resistance, and also having more satisfactory fluidity at the time of shaping.

The carbon fiber-reinforced plastic of the present invention is a fiber-reinforced plastic including carbon fibers and a matrix resin, in which the fiber length of the carbon fibers is 1 mm to 100 mm, the degree of orientation pf of the carbon fibers in a direction that orthogonally intersects the thickness direction is 0.001 to 0.8, and the eccentricity coefficient ec of the orientation profile of the carbon fibers in a plane that orthogonally intersects the thickness direction is $1 \times 10^{-5}$ to $9 \times 10^{-5}$. The carbon fiber-reinforced plastic of the present invention is obtained by using the method for producing a fiber-reinforced plastic of the present invention described above, and using carbon fibers as the reinforcing fibers.

[Fiber Length]

The length of the carbon fibers is 1 mm to 100 mm, preferably 3 mm to 70 mm, more preferably 5 mm to 50 mm, even more preferably 10 mm to 50 mm, and particularly preferably 10 mm to 35 mm. When the fiber length of the carbon fibers is more than or equal to the lower limit, required mechanical characteristics may be easily obtained. When the fiber length of the carbon fibers is less than or equal to the upper limit, fluidity needed at the time of shaping may be easily obtained.

[Method for Measuring Fiber Length]

The resin in a carbon fiber-reinforced plastic is burned off to take out carbon fibers only, and the fiber lengths of the carbon fibers are measured with a vernier caliper or the like. Measurement is made for randomly selected one hundred carbon fibers, and the fiber length is calculated as the mass average of the values.

[Degree of Orientation Pf]

The state of orientation of carbon fibers in a direction orthogonally intersecting the thickness direction in the carbon fiber-reinforced plastic of the present invention is represented by the degree of orientation pf. When it is said that the pf is "zero (0)", it means that the carbon fibers are oriented in an ideal state in a direction orthogonally intersecting the thickness direction of the carbon fiber-reinforced plastic. A larger value of pf indicates that the degree of disarrangement of the carbon fibers toward the outside of a plane that orthogonally intersects the thickness direction is higher.

The pf of the carbon fiber-reinforced plastic of the present invention is 0.001 to 0.8. Although fluidity at the time of shaping may vary depending on the fiber length of the carbon fibers, as the value of ph is larger, it is more difficult to obtain fluidity at the time of shaping due to entanglement of the carbon fibers or friction between the carbon fibers. That is, as the carbon fibers are disarranged toward the outside of a plane that orthogonally intersects the thickness direction, entanglement of the carbon fibers or friction between the carbon fibers is prone to occur, and it is difficult to obtain fluidity at the time of shaping. In a case in which the fiber length of the carbon fibers is 1 mm to 100 mm, when the pf is 0.8 or less, sufficient fluidity is obtained at the time of shaping, and sufficient mechanical properties are also obtained. The lower limit of the pf is not particularly restricted in view of the physical properties of the carbon fiber-reinforced plastic. However, it is difficult to adjust the pf to zero (0), and 0.001 or greater is a realistic value. The upper limit of the pf is preferably 0.5, more preferably 0.3, and even more preferably 0.15.

[Method for Measuring pf]

Figure 3:
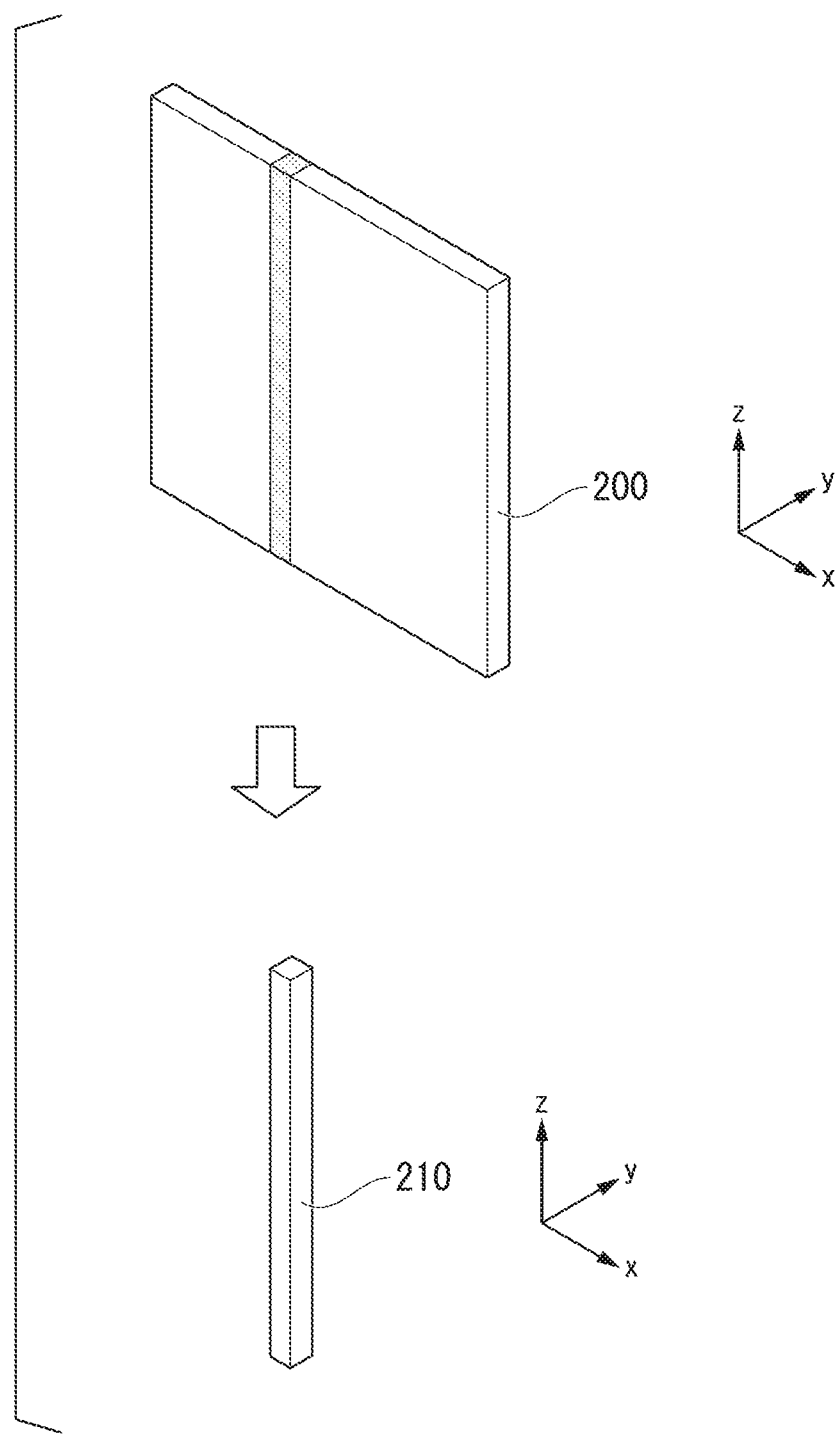
FIG. 3 is a schematic diagram illustrating a process for a method for measuring the degree of orientation pf.

As illustrated in FIG. 3, a measurement sample 210 having a width of 2 mm is cut out from a carbon fiber-reinforced plastic 200 having a thickness of 2 mm, and measurement is performed as follows.

The width direction in the measurement sample 210 is designated as x-direction, the thickness direction as y-direction, and the length direction as z-direction.

(Actually Measured Integral Value in x-Direction)

A measurement sample 210 is irradiated with X-radiation in the x-direction, and a one-dimensional orientation profile originating from diffraction of the 002 plane of graphite is obtained. The one-dimensional orientation profile originating from diffraction of the 002 plane of graphite is obtained by a method of inputting an image using a two-dimensional detector, and then obtaining a profile in the circumferential direction with regard to the 002 diffraction part using an analytic software program. Furthermore, with a one-dimensional detector, a one-dimensional orientation profile originating from diffraction of the 002 plane of graphite may also be obtained by fixing the detector at the site of the 002 diffraction and rotating the sample 360°.

Next, the actually measured integral value Sx in the x-direction is calculated by the following Expression (1) from the one-dimensional orientation profile thus obtained.

[Mathematical Formula 1]

$$Sx = \int_0^{2\pi} I(\delta) d\delta \qquad (1)$$

Here, in Expression (1), I(δ) is the intensity obtainable at the azimuth angle S based on the z-direction in a yz plane in the one-dimensional orientation profile.

When the carbon fibers are perfectly oriented in the x-direction, the Sx has the maximum value. As the carbon fibers have a gradient in the x-direction, the value of Sx becomes smaller. Factors that make Sx smaller include the component in the thickness direction in the gradient with respect to the x-direction of the carbon fibers, and the component in a plane that orthogonally intersects the thickness direction. That is, both the component in the yz plane and the component in the xz plane with respect to the x-direction of the carbon fibers are the factors causative of the decrease in Sx. In regard to the pf, since the degree of disarrangement of carbon fibers toward the outside of a plane that orthogonally intersects the thickness direction is evaluated, the following operation is performed in order to eliminate the effect of the component within the xz plane on the gradient of the carbon fibers.

(Predicted Integral Value in x-Direction)

A measurement sample 210 is irradiated with X-radiation in the y-direction, and a one-dimensional orientation profile originating from diffraction of the 002 plane of graphite is obtained. Subsequently, 1(φ) is normalized by the following Expression (2), and the fiber proportion G(φ) at the azimuth angle φ is calculated.

[Mathematical Formula 2]

$$G(\varphi) = \frac{I(\varphi)}{\int_0^{2\pi} I(\varphi) d\varphi} \qquad (2)$$

Here, in Expression (2), I(φ) is the intensity obtainable at the azimuth angle φ based on the z-direction in the xz plane in the one-dimensional orientation profile.

Next, the predicted integral value F in the x-direction is calculated by the following Expression (3).

[Mathematical Formula 3]

$$F = 2 \frac{Va}{Vb} \int_0^{\pi} G(\varphi) A(\varphi) d\varphi \qquad (3)$$

Here, Va represents the fiber volume percentage content (Vf) of carbon fibers in the measurement sample 210; Vb represents the fiber volume percentage content (Vf) of carbon fibers in a standard sample for correction that will be described below. A(φ) represents the coefficient for intensity correction.

The coefficient for intensity correction A(φ) is determined as follows.

As a standard sample for correction, a UD material having a thickness of 2 mm is produced, in which carbon fibers are unidirectionally arranged in parallel such that the carbon fibers are perfectly oriented in the z-direction, and this is designated as a 0° material. Regarding the carbon fibers and the matrix resin used in the standard sample, the same kinds of carbon fibers and matrix resin as the measurement sample 210 are used. Va, the fiber volume percentage content (Vf) of carbon fibers in the measurement sample 210, and Vb, the fiber percentage content (Vf) of carbon fibers in the standard sample, may be identical or may be different.

Subsequently, as a new standard sample, a 15° material is produced in the same manner as in the 0° material, except that carbon fibers are unidirectionally arranged in parallel such that the azimuth angle φ is perfectly oriented in the direction of 15°. Similarly, a 30° material, a 45° material, a 60° material, a 75° material, and a 90° material are produced, in which carbon fibers are unidirectionally arranged in parallel such that the azimuth angle φ is perfectly oriented in the directions of 30°, 45°, 600, 75°, and 90°, respectively.

Next, standard measurement samples each having a width of 2 mm are cut out from the various standard samples in the same manner as in the case of the measurement sample 210. For each standard measurement sample, X-radiation is caused to enter the sample in the x-direction, and a one-dimensional orientation profile originating from diffraction of the 002 plane of graphite is obtained. In the one-dimensional orientation profile of the standard measurement sample originating from the 90° material, the intensity has an almost constant value. From the one-dimensional orientation of each of the various standard measurement samples, the integral value S(φ) of the intensity I(φ,δ) of the material of the azimuth angle φ is calculated by the following Expression (4).

[Mathematical Formula 4]

$$S(\varphi) = \int_0^{2\pi} I(\varphi, \delta) d\delta \qquad (4)$$

Here, I(φ,δ) represents the intensity obtainable at the azimuth angle δ for the standard measurement sample of the azimuth angle φ.

The integral value S(φ) is in the relation: S(φ)=S(π−φ). A graph is produced by plotting φ on the horizontal axis and plotting S(φ) on the vertical axis, and a resultant obtained by performing normal distribution approximation at φ in the range of 0° to 180° is designated as the intensity correction coefficient A(φ) at the azimuth angle φ.

(Corrected Predicted Integral Intensity in x-Direction)

The predicted integral value F in the x-direction and the actually measured integral value Sx do not necessarily coincide. Thus, the integral value correction coefficient B(Sx) is calculated using standard samples.

Standard measurement samples are cut out from various standard samples in the same manner as in the case of the calculation of the intensity correction coefficient A(φ). For each of the various standard measurement samples, the actually measured integral value Sx(α) is calculated by the method for calculating the actually measured integral value in the x-direction as described above. Meanwhile, α is 0°, 15°, 30°, 45°, 60°, 75°, or 90°. Furthermore, for each of the various standard measurement samples, the predicted integral value F(α) in the x-direction is determined by the method for calculating the predicted integral value in the x-direction as described above. When a graph is produced by plotting Sx(α) on the horizontal axis and plotting Sx(α)/F(α)

on the vertical axis, a high correlation is found. A resultant of performing linear approximation is designated as the integral correction coefficient B(Sx).

The predicted integral value F in the x-direction is multiplied by the integral correction coefficient B(Sx), and the product is designated as the corrected predicted integral intensity F' in the x-direction.

(Calculation of pf)

The pf is calculated by the following Expression (5).

[Mathematical Formula 5]

$$Pf = \left| \frac{F'}{Sx} - 1 \right| \quad (5)$$

[Eccentricity Coefficient ec]

Dispersibility of the two-dimensional orientation of carbon fibers in a plane that orthogonally intersecting the thickness direction in the carbon fiber-reinforced plastic according to the present invention, can be represented by the eccentricity coefficient ec of the orientation profile of carbon fibers in the relevant plane. ec is the eccentricity coefficient from an approximate ellipse of the orientation profile.

The ec of the carbon fiber-reinforced plastic of the present invention is $1 \times 10^{-5}$ to $9 \times 10^{-5}$. In a carbon fiber-reinforced plastic in which the reinforcing fibers are randomly oriented, a larger value of ec means larger variation in the mechanical properties.

When the ec is $9 \times 10^{-5}$ or less, variation in the mechanical properties can be suppressed. The ec of the carbon fiber-reinforced plastic of the present invention is preferably $8.5 \times 10^{-5}$ or less, and more preferably $8 \times 10^{-5}$ or less.

There are no particular limitations on the preferred lower limit of ec, in view of the mechanical properties of the carbon fiber-reinforced plastic. However, for example, as the fiber length of the carbon fibers becomes longer, the difficulty in the production of a carbon fiber-reinforced plastic having a small value of ec increases. When the fiber length of the carbon fibers is lengthened, mechanical characteristics are enhanced; however, the value of ec tends to increase along with the enhancement. Thus, variation in the mechanical properties increases. When the balance between the mechanical characteristics and the variation thereof is considered, a preferred lower limit, which is realistic from the viewpoint of production, of ec according to the fiber length of the carbon fiber is as follows. In a case in which the fiber length of the carbon fibers is 1 mm to 3 mm, the ec is preferably $1 \times 10^{-5}$ or more. In a case in which the fiber length of the carbon fibers is more than 3 mm and 10 mm or less, the ec is preferably $1.5 \times 10^{-5}$ or more. In a case in which the fiber length of the carbon fibers is more than 10 mm and 35 mm or less, the ec is preferably $2 \times 10^{-5}$ or more. In a case in which the fiber length of the carbon fibers is more than 35 mm and 70 mm or less, the ec is preferably $3 \times 10^{-5}$ or more. In a case in which the fiber length of the carbon fibers is more than 70 mm and 100 mm or less, the ec is preferably $4 \times 10^{-5}$ or more.

[Method for Measuring ec]

The profile of intensity $I(\varphi)$ at the azimuth angle $\varphi$, which is measured when the predicted integral value in the x-direction is determined upon measurement of the pf, is approximated as an ellipse $Ia(\varphi)$ represented by the following Expression (6).

[Mathematical Formula 6]

$$Ia(\varphi) = \{a^2 \cos^2(\varphi-\beta) + b^2 \sin^2(\varphi-\beta)\}^{1/2} \quad (6)$$

Here, in Expression (6), a represents the major axis of the ellipse; b represents the minor axis of the ellipse; and β represents the angle of rotation.

The numerical values of a, b, and β in a case in which $Ia(\varphi)$ approaches most closely to $I(\varphi)$ may be calculated such that the eccentricity R from an ellipse, which is represented by the following Expression (7), has the minimum value. Further, the minimum value of the eccentricity R in that case is designated as ec.

[Mathematical Formula 7]

$$R = \frac{1}{\text{Number of measured points}} \sum (I(\varphi) - Ia(\varphi))^2 \quad (7)$$

[Dispersion Parameter dp]

Three-dimensional dispersion of carbon fibers in the carbon fiber-reinforced plastic of the present invention is represented by the dispersion parameter dp of carbon fibers in a cross-section in the thickness direction of the carbon fiber-reinforced plastic. When it is said that dp is "100", it means that carbon fibers are dispersed in a matrix resin in an ideal state. As the value of dp is smaller, it is implied that the proportion of carbon fibers locally aggregated is high, and the proportion of resin-rich parts is high.

The dp of the carbon fiber-reinforced plastic of the present invention is preferably 80 to 100.

As the value of dp is smaller, and the dispersibility of carbon fibers is poorer, heat resistance becomes inferior. When dp is 80 or more, satisfactory heat resistance may be easily obtained. The dp of the carbon fiber-reinforced plastic of the present invention is preferably 84 or more, and more preferably 88 or more. The upper limit of dp of the carbon fiber-reinforced plastic of the present invention is theoretically 100. A preferred upper limit of dp that is realistic from the viewpoint of production is 98.

Fluidity at the time of shaping of the carbon fiber-reinforced plastic is generated by the flow of resin or slipping of a resin layer at the time of shaping. Therefore, as the path through which the resin in the carbon fiber-reinforced plastic can flow is wider, higher fluidity is obtained at the time of shaping. That is, as the value of dp is smaller, fluidity at the time of shaping is higher. However, in regard to the carbon fiber-reinforced plastic of the present invention, since the pf is controlled to the range described above, even if the value of dp is high, high fluidity is exhibited.

[Method for Measuring dp]

dp can be measured by processing a photograph of a cross-section in the thickness direction of a sample specimen cut out from a carbon fiber-reinforced plastic, using an image editing software program.

Specifically, for example, a sample specimen is cut out from a carbon fiber-reinforced plastic, and a cross-sectional photograph of the sample specimen is taken. For the process of taking the cross-sectional photograph, for example, an optical microscope can be used. From the viewpoint that the accuracy of evaluation based on dp becomes higher, the dot pitch for the resolution at the time of photograph taking is preferably $\frac{1}{10}$ or less, and more preferably $\frac{1}{20}$ or less, of the diameter of the carbon fibers.

Next, the photograph of cutting is processed as follows using an image editing software program.

In the photograph of cutting, a portion corresponding to the extent of a rectangle having a size of 2 mm in the thickness direction in a cross-section of the sample specimen and 1.5 mm in a direction orthogonal to the thickness direction, is assigned as a processing object image. The processing object image is subjected to binarization into carbon fiber parts, and resin parts as well as void parts using the image editing software program. For example, a processing object image in which carbon fiber parts are indicated in white, resin parts are indicated in grey, and void parts are indicated in black, is subjected to binarization by presenting the carbon fiber parts in black, and the resin parts as well as the void parts in green.

Figure 4:
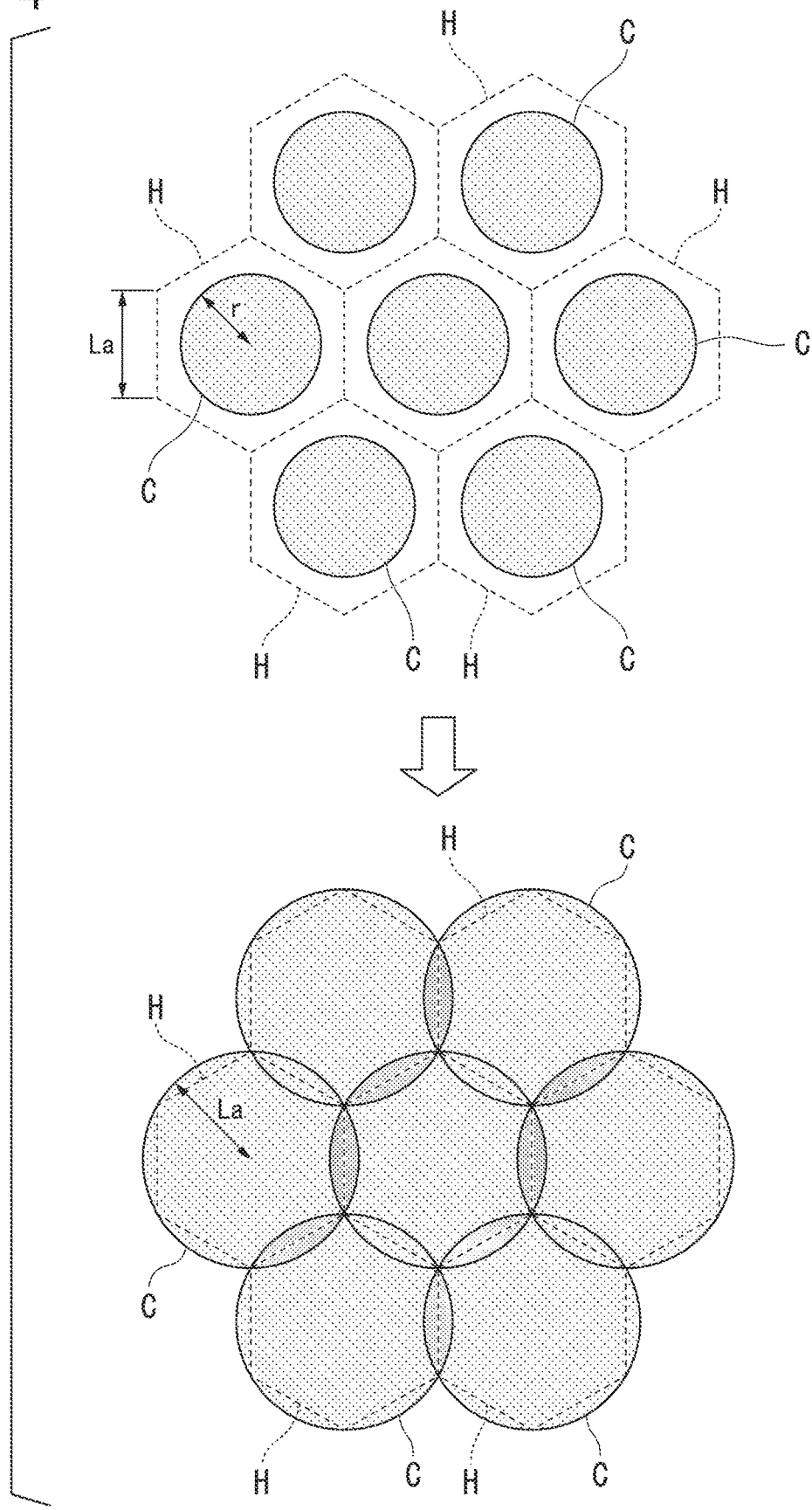
FIG. 4 is a schematic diagram explaining the processing carried out using an image processing software program for calculation of the dispersion parameter dp.

In a cut surface of a carbon fiber-reinforced plastic having a radius of carbon fibers of r (µm) and a fiber volume percentage content of Vf (vol %), the length of one edge, La, of a unit regular hexagon TI obtainable when carbon fibers C have been theoretically perfectly dispersed as illustrated in FIG. 4, can be determined by the following Expression (8).

[Mathematical Formula 8]

$$La = \frac{\sqrt{\frac{2\pi}{Vf}} \times r}{\sqrt[4]{27}} \quad (8)$$

In regard to the carbon fiber parts of the processing object image after binarization, it is assumed that the carbon fibers are theoretically perfectly dispersed as illustrated in FIG. 4. Then, the radius of the carbon fiber is lengthened by the portion of the length Le represented by the following Expression (9), and the carbon fiber parts that have been binarized by the image editing software program are expanded such that the radius of the carbon fiber becomes La. Meanwhile, Le is a distance corresponding to a half of the distance at a site where the distance between outer wall surfaces of adjoining carbon fibers is the largest, in a state in which carbon fibers are ideally dispersed. If the expansion treatment is carried out when carbon fibers are indeed ideally dispersed in the carbon fiber parts that have been binarized, the carbon fiber parts occupy the entire area of the processing object image.

After the expansion treatment using the image editing software described above, dp is calculated by the following Expression (10).

[Mathematical Expression 9]

$$Le = La - r = r \times \left( \frac{\sqrt{\frac{2\pi}{Vf}}}{\sqrt[4]{27}} - 1 \right) \quad (9)$$

$$dp = (S1/S2) \times 100 \quad (10)$$

Here, in Expression (10), S1 represents the area of carbon fiber parts after the expansion treatment in the processing object image; and S2 represents the total area of the processing object image.

The carbon fibers or matrix resin that constitute the carbon fiber-reinforced plastic of the present invention are as explained in connection with the method for producing a fiber-reinforced plastic described above.

The fiber volume percentage content (Vf) of carbon fibers in the carbon fiber-reinforced plastic is preferably 5% to 70% by volume, more preferably 10% to 60% by volume, and even more preferably 15% to 50% by volume. When the Vf of the carbon fibers is less than or equal to the upper limit, a decrease in the interfacial strength caused by decreased toughness does not easily occur, and fluidity at the time of shaping is also not easily decreased. When the Vf of the carbon fibers is more than or equal to the lower limit, the mechanical characteristics needed for a fiber-reinforced plastic may be easily obtained.

Meanwhile, the Vf value of a fiber-reinforced plastic means the proportion of reinforcing fibers relative to the total volume of the reinforcing fibers, matrix resin, and other components such as additives, excluding voids (gas), in the fiber-reinforced plastic. Since the Vf value measured according to JIS K7075 is a value that varies depending on the existing amount of voids in the fiber-reinforced plastic, in the present invention, a fiber volume percentage content that does not depend on the existing amount of voids is employed.

The carbon fiber-reinforced plastic of the present invention may include other reinforcing fibers in addition to carbon fibers, and additives, to the extent that the purposes of the present invention are not impaired.

Examples of the other reinforcing fibers include glass fibers, organic fibers, and metal fibers.

Examples of the additives include a non-fibrous filler, a flame retardant, a pigment, a mold releasing agent, a plasticizer, and a surfactant.

The thickness of the carbon fiber-reinforced plastic of the present invention is preferably 0.1 mm to 10.0 mm, and more preferably 0.25 mm to 6.0 mm. When the thickness is less than or equal to the upper limit, the matrix resin does not easily squeeze out at the time of pressing in Step (ii), and the thickness can be easily controlled. When the thickness is more than or equal to the lower limit, the carbon fiber-reinforced plastic is easily subjected to shear stress at the time of pressing in Step (ii), and carbon fibers are randomized so that it becomes easy to control isotropy or anisotropy of the mechanical characteristics.

Hereinafter, the present invention will be explained in detail by way of Examples, but the present invention is not intended to be limited by the following description.

[Evaluation of Mechanical Properties]

A bending test specimen having a length of 100 mm and a width of 25 mm was cut out from a fiber-reinforced plastic thus obtained, using a wet type cutter, and a three-point bending test was performed according to the test method defined in JIS K7074. At this time, a bending test specimen in which the longitudinal direction of the specimen was coincident with the MD direction (direction 90° to the shaft line direction of rolls) at the time of producing the fiber-reinforced plastic, and a bending test specimen in which the longitudinal direction of the specimen was coincident with the TD direction (shaft line direction of rolls) were respectively produced, and then the test was performed. Regarding the testing machine, an Instron universal tester Model 4465 was used. Furthermore, the test was performed at room temperature (23° C.) and at 80° C. The number of test specimens used for measurement was respectively set to n=6, the average value of those specimens was calculated, and the average value was designated as flexural strength. A standard deviation was calculated from the measured values of flexural strength, and the standard deviation was divided by the average value to calculate the coefficient of variation (CV value, unit: %), which is an index of variation.

The flexural strength ratio $\sigma_A/\sigma_B$ was calculated. Here, $\sigma_A$ represents the flexural strength measured at room temperature for a bending test specimen, in which the longitudinal direction coincided with the MD direction at the time of producing the fiber-reinforced plastic. $\sigma_B$ represents the flexural strength measured at room temperature for a bending test specimen, in which the longitudinal direction coincided with the TD direction at the time of producing the fiber-reinforced plastic.

The flexural strength ratio $\sigma_C/\sigma_D$ was calculated. Here, $\sigma_C$ represents the average value of the flexural strengths measured at 80° C. for a bending test specimen in which the longitudinal direction coincided with the MD direction at the time of producing the fiber-reinforced plastic, and a bending test specimen in which the longitudinal direction coincided with the TD direction. $\sigma_D$ represents the average value of the flexural strengths measured at room temperature for a bending test specimen in which the longitudinal direction coincided with the MD direction at the time of producing the fiber-reinforced plastic, and a bending test specimen in which the longitudinal direction coincided with the TD direction.

In regard to the evaluation of the flexural strength ratio $\sigma_A/\sigma_B$, a sample in which isotropy was obviously poor, and the flexural strength ratio $\sigma_A/\sigma_B$ was 5 or more, or 0.2 or less, was rated as "x".

[Evaluation of Fluidity]

A plate-shaped material which measured 78 mm in width and 78 mm in length was cut out from a fiber-reinforced plastic thus obtained. Plural sheets of the plate-shaped material were stacked so as to obtain a thickness of about 4 mm, and the laminate was heated for 10 minutes at 230° C. using a mini test press (manufactured by Toyo Seiki Seisaku-sho, Ltd., product name: MP-2FH), and then was pressed for 60 seconds under the conditions of 145° C. and 5 MPa. The initial thickness $h_A$ (mm) obtained before press molding and the final thickness $h_B$ (mm) obtained after press molding were measured, and fluidity was evaluated based on the ratio $h_A/h_B$ obtained by dividing the initial thickness by the final thickness.

In regard to the evaluation of fluidity, a sample in which the ratio $h_A/h_B$ was less than 1.1 was rated as "x". Meanwhile, there is a situation that the plate-shaped material increases in thickness at the time of heating due to the residual stress of the reinforcing fibers in the plate-shaped material, which is referred to as spring-back. The case in which the plate-shaped material did not restore the original thickness even if the plate-shaped material was press molded after undergoing spring-back with heating for 10 minutes, was also rated as "x".

[Evaluation of pf and ec]

The values of pf and ec were respectively measured according to the measurement method for pf and the measurement method for ec described above. An X-ray diffraction analysis was carried out using an X-ray diffraction apparatus (manufactured by Rigaku Co., Ltd., TTR-III) equipped with a fiber sample stage, by mounting a measurement sample on the stage and using a Cu target. Specifically, while the measurement sample was irradiated with X-radiation from the upper side, the measurement sample was rotated about the thickness direction as an axis, and diffracted X-radiation was detected with a detector disposed at a diffraction angle 2θ=24.5°. As a standard sample, a sample having a Vf of 35% by volume was used.

[Evaluation of dp]

A sample specimen which measured 3 cm on each side was cut out from a carbon fiber-reinforced plastic, and was embedded in TECHNOVIT 4000 manufactured by Heraeus Kulzer GmbH. After being cured, TECHNOVIT 4000 was polished so that a cross-section of the sample specimen was exposed, and TECHNOVIT 4000 was subjected to a mirror surface treatment.

Next, a cross-sectional photograph of the sample specimen was taken under the following conditions.

(Photographing Conditions)

Apparatus: Industrial optical microscope BX51M manufactured by Olympus Corporation.

Lens magnification: 500 times

Imaging dot pitch: 0.17 μm

In the cross-sectional photograph thus obtained, an area corresponding to the range of 2 mm in the thickness direction in the cross-section of a sample specimen and 0.5 mm in a direction orthogonal to the thickness direction, was designated as a processing object image. The value of dp was calculated by the method for measuring dp as described above, using software WIN-ROOF as an image editing software program. Calculation of dp was performed at five sites in a cross-section of each sample specimen, and the average value was determined.

Production Example 1: Production of Prepreg Substrate-1

Carbon fibers (PYROFIL TR50S manufactured by Mitsubishi Rayon Co., Ltd., carbon fiber diameter: 7 μm) were arranged in parallel in one direction and in a planar form, and thus a fiber sheet having a basis weight of 72 g/m² was obtained. Both surfaces of this fiber sheet were interposed between films each formed from an acid-modified polypropylene resin (MODIC P958V manufactured by Mitsubishi Chemical Corp., MFR50) and having a basis weight of 36 g/m². These were subjected to heating and pressing by passing them through between calendar rolls several times, and the fiber sheet was impregnated with the resin. Thus, prepreg substrate-1 having a fiber volume percentage content (Vf) of 33% by volume and a thickness of 120 μm was produced.

Production Example 2: Production of Prepreg Substrate-2

Carbon fibers (PYROFIL TR50S manufactured by Mitsubishi Rayon Co., Ltd.) were arranged in parallel in one direction and in a planar form, and thus a fiber sheet having a basis weight of 37 g/m² was obtained. Both surfaces of this fiber sheet were interposed between films each formed from an acid-modified polypropylene resin (MODIC P958V manufactured by Mitsubishi Chemical Corp., MFR50) and having a basis weight of 45 g/m². These were subjected to heating and pressing by passing them through between calendar rolls several times, and the fiber sheet was impregnated with the resin. Thus, prepreg substrate-2 having a fiber volume percentage content (Vf) of 17% by volume and a thickness of 120 μm was produced.

Production Example 3: Production of Prepreg Substrate-3

Carbon fibers (PYROFIL TR50S manufactured by Mitsubishi Rayon Co., Ltd.) were arranged in parallel in one direction and in a planar form, and thus a fiber sheet having a basis weight of 105 g/m² was obtained. Both surfaces of this fiber sheet were interposed between films each formed from an acid-modified polypropylene resin (MODIC P958V manufactured by Mitsubishi Chemical Corp., MFR50) and having a basis weight of 27 g/m². These were subjected to heating and pressing by passing them through between calendar rolls several times, and the fiber sheet was impregnated with the resin. Thus, prepreg substrate-3 having a fiber volume percentage content (Vf) of 49% by volume and a thickness of 120 μm was produced.

Example 1

Rectangular-shaped prepreg substrate sheets each having a size of 220 mm (0°-direction with respect to the fiber axis)×900 mm (90°-direction with respect to the fiber axis) were cut out from the prepreg substrate-1 obtained in Production Example 1. An incision-inserted prepreg substrate was obtained by inserting slits having a depth that would cut the reinforcing fibers into the cut prepreg substrate, using a cutting plotter (L-2500 cutting plotter manufactured by Laserck Corp.), such that the absolute value of the angle ϕ formed by the fiber axes of the reinforcing fibers was 45°, and the fiber length L of the reinforcing fibers was 25 mm. Eight sheets of the incision-inserted prepreg substrate were laminated such that the fiber axes of the reinforcing fibers were in the same direction, and thus a prepreg laminate was obtained. The thickness of the prepreg laminate was 1.0 mm.

Figure 2:
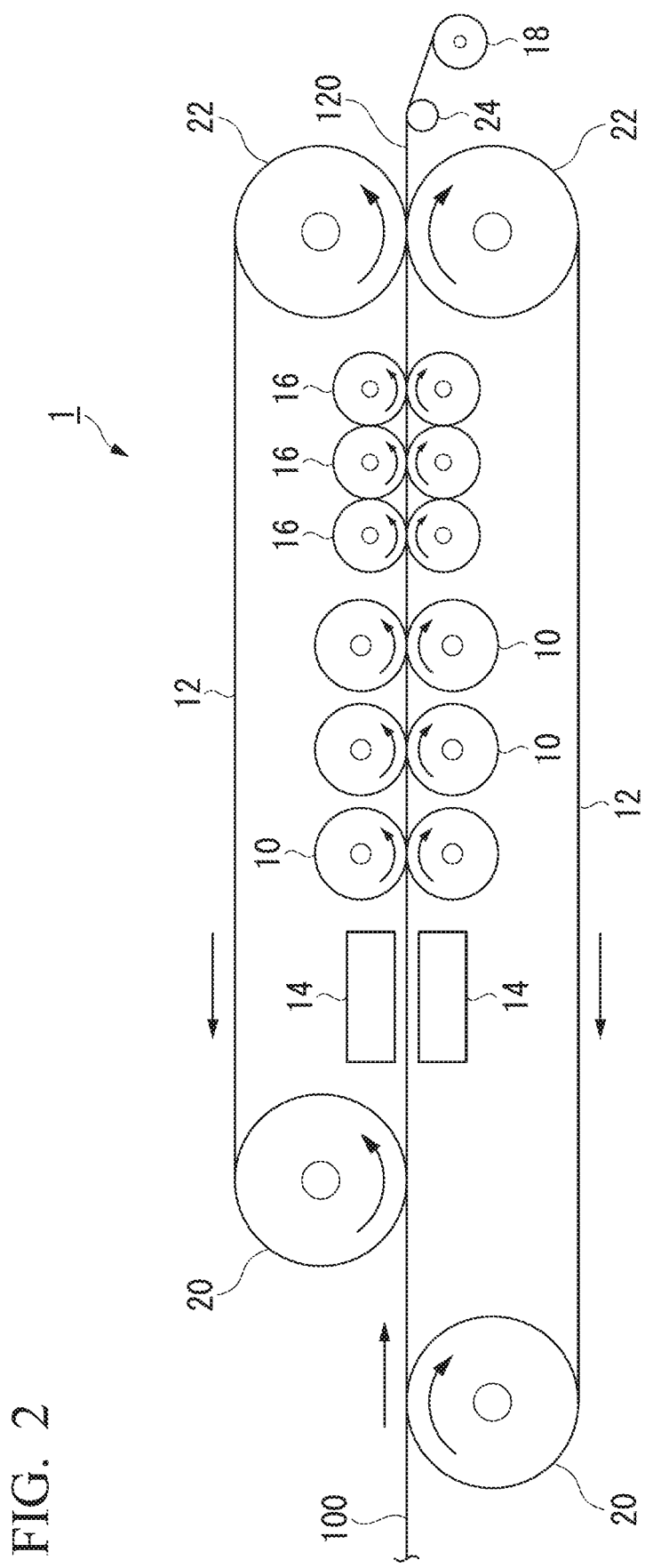
FIG. 2 is a schematic diagram illustrating an example of a double belt-type heat press machine.

As a pressing apparatus, a double belt-type heat press machine such as illustrated in FIG. 2, which included two rows of press rolls, the shaft direction of which was coincident with a direction orthogonal to the travel direction of the material (A), and the upper and lower belts were driven at a rate of 1.0 m/min, was used. Furthermore, the prepreg laminate was introduced into the double belt-type heat press machine such that the angle θ formed by the fiber axial direction of the reinforcing fibers in each prepreg substrate-1 with respect to the orthogonal direction described above would be 0°. In the double belt-type heat press machine, the prepreg laminate was heated by two rows of press rolls under the conditions of a roll temperature of 270° C. and a linear pressure of 10.7 N/m, and the prepreg laminate was pressed in a state in which the thermoplastic resin was melted. Subsequently, the prepreg laminate was passed through a 1.5-m long cooling section equipped with one row of warm water rolls under the conditions of a roll temperature of 30° C. and a linear pressure of 2.5 N/m, and the thermoplastic resin was solidified. Thus, a fiber-reinforced plastic was obtained. Meanwhile, the travel speed of the prepreg laminate was the same as the driving speed of the belt.

The results obtained by evaluating the mechanical properties of the fiber-reinforced plastic are presented in Table 1. The fiber-reinforced plastic had satisfactory mechanical properties, and also had less variation. Furthermore, the flexural strength ratio $\sigma_C/\sigma_D$ was 0.5 or higher, and the fiber-reinforced plastic had satisfactory heat resistance. Furthermore, the ratio $h_A/h_B$ was 1.5, and the fiber-reinforced plastic had satisfactory fluidity.

Example 2

A fiber-reinforced plastic was obtained in the same manner as in Example 1, except that 16 sheets of the incision-inserted prepreg substrate were laminated such that the fiber axes of the reinforcing fibers were in the same direction, and thus a prepreg laminate having a thickness of 1.9 mm was obtained.

The results obtained by evaluating the mechanical properties of the fiber-reinforced plastic are presented in Table 1. The fiber-reinforced plastic had satisfactory mechanical properties, and also had less variation. Furthermore, the flexural strength ratio $\sigma_C/\sigma_D$ was 0.5 or higher, and the fiber-reinforced plastic had satisfactory heat resistance.

Example 3

A fiber-reinforced plastic was obtained in the same manner as in Example 1, except that the absolute value of the angle ϕ formed by the fiber axial direction of the reinforcing fibers and the direction of slits was set to 30°.

The results obtained by evaluating the mechanical properties of the fiber-reinforced plastic are presented in Table 1. The fiber-reinforced plastic had satisfactory mechanical properties, and also had less variation. Furthermore, the flexural strength ratio $\sigma_C/\sigma_D$ was 0.5 or higher, and the fiber-reinforced plastic had satisfactory heat resistance.

Example 4

A fiber-reinforced plastic was obtained in the same manner as in Example 1, except that the absolute value of the angle ϕ formed by the fiber axial direction of the reinforcing fibers and the direction of slits was set to 60°.

The results obtained by evaluating the mechanical properties of the fiber-reinforced plastic are presented in Table 1. The fiber-reinforced plastic had satisfactory mechanical properties, and also had less variation. Furthermore, the flexural strength ratio $\sigma_C/\sigma_D$ was 0.5 or higher, and the fiber-reinforced plastic had satisfactory heat resistance.

Example 5

A fiber-reinforced plastic was obtained in the same manner as in Example 1, except that the absolute value of the angle ϕ formed by the fiber axial direction of the reinforcing fibers and the direction of slits was set to 60°, 4 sheets of the incision-inserted prepreg substrate were laminated such that the fiber axes of the reinforcing fibers were in the same direction, and a prepreg laminate having a thickness of 0.5 mm was obtained.

The results obtained by evaluating the mechanical properties of the fiber-reinforced plastic are presented in Table 1. The fiber-reinforced plastic had satisfactory mechanical properties, and also had less variation.

Example 6

A fiber-reinforced plastic was obtained in the same manner as in Example 1, except that the absolute value of the angle ϕ formed by the fiber axial direction of the reinforcing fibers and the direction of slits was set to 60°, 16 sheets of the incision-inserted prepreg substrate were laminated such that the fiber axes of the reinforcing fibers were in the same direction, and a prepreg laminate having a thickness of 1.9 mm was obtained.

The results obtained by evaluating the mechanical properties of the fiber-reinforced plastic are presented in Table 1. The fiber-reinforced plastic had satisfactory mechanical properties, and also had less variation. Furthermore, the flexural strength ratio $\sigma_C/\sigma_D$ was 0.5 or higher, and the fiber-reinforced plastic had satisfactory heat resistance.

Example 7

A fiber-reinforced plastic was obtained in the same manner as in Example 1, except that the absolute value of the angle φ formed by the fiber axial direction of the reinforcing fibers and the direction of slits was set to 90°.

The results obtained by evaluating the mechanical properties of the fiber-reinforced plastic are presented in Table 1. The fiber-reinforced plastic had satisfactory mechanical properties, and also had less variation. Furthermore, the flexural strength ratio $\sigma_C/\sigma_D$ was 0.5 or higher, and the fiber-reinforced plastic had satisfactory heat resistance.

Example 8

A fiber-reinforced plastic was obtained in the same manner as in Example 1, except that the fiber length L of the reinforcing fibers was adjusted to 12.5 mm.

The results obtained by evaluating the mechanical properties of the fiber-reinforced plastic are presented in Table 1. The fiber-reinforced plastic had satisfactory mechanical properties, and also had less variation. Furthermore, the flexural strength ratio $\sigma_C/\sigma_D$ was 0.5 or higher, and the fiber-reinforced plastic had satisfactory heat resistance.

Example 9

A fiber-reinforced plastic was obtained in the same manner as in Example 1, except that the travel speed of the prepreg laminate was set to 0.5 m/min. The travel speed of the prepreg laminate was reduced to a half compared to Example 1, and this implies that the heating and pressing time was substantially doubled.

The results obtained by evaluating the mechanical properties of the fiber-reinforced plastic are presented in Table 2. The fiber-reinforced plastic had satisfactory mechanical properties, and also had less variation. Furthermore, the flexural strength ratio $\sigma_C/\sigma_D$ was 0.5 or higher, and the fiber-reinforced plastic had satisfactory heat resistance. In addition, the flexural strength ratio $\sigma_A/\sigma_B$ was 0.83, and the mechanical properties of the fiber-reinforced plastic became anisotropic.

Example 10

A fiber-reinforced plastic was obtained in the same manner as in Example 1, except that the travel speed of the prepreg laminate was set to 2.0 m/min. The travel speed of the prepreg laminate was doubled compared to Example 1, and this implies that the heating and pressing time was substantially reduced to a half.

The results obtained by evaluating the mechanical properties of the fiber-reinforced plastic are presented in Table 2. The fiber-reinforced plastic had satisfactory mechanical properties, and also had less variation. Furthermore, the flexural strength ratio $\sigma_C/\sigma_D$ was 0.5 or higher, and the fiber-reinforced plastic had satisfactory heat resistance. In addition, the flexural strength ratio $\sigma_A/\sigma_B$ was 0.37, and the fiber-reinforced plastic was a material having mechanical properties that were specifically strong in one direction.

Example 11

An incision-inserted prepreg substrate was obtained in the same manner as in Example 1, except that rectangular-shaped prepreg substrate sheets each having a size of 220 mm (30°-direction with respect to the fiber axis)×900 mm (−75°-direction with respect to the fiber axis) were cut out from the prepreg substrate-1. Eight sheets of the incision-inserted prepreg substrate were laminated such that the fiber axes of the reinforcing fibers were in the same direction, and a prepreg laminate having a thickness of 1.0 mm was obtained.

A fiber-reinforced plastic was obtained in the same manner as in Example 1, except that the prepreg laminate was introduced into a double belt-type heat press machine such that the angle θ would be 15°.

The results obtained by evaluating the mechanical properties of the fiber-reinforced plastic are presented in Table 2. The fiber-reinforced plastic had satisfactory mechanical properties, and also had less variation. Furthermore, the flexural strength ratio $\sigma_C/\sigma_D$ was 0.5 or higher, and the fiber-reinforced plastic had satisfactory heat resistance.

Example 12

A fiber-reinforced plastic was obtained in the same manner as in Example 1, except that 4 sheets of the incision-inserted prepreg substrate were laminated such that the fiber axes of the reinforcing fibers were in the same direction, and a prepreg laminate having a thickness of 0.5 mm was obtained. The ratio $h_A/h_B$ of the fiber-reinforced plastic was 1.5, and the fiber-reinforced plastic had satisfactory fluidity.

Next, plate pieces each measuring 298 mm on each side were cut out from the fiber-reinforced plastic thus obtained, and 4 sheets of the plate pieces were laminated. The laminate was disposed inside a pillbox mold which measured 300 mm on each side and 15 mm in depth, the mold was heated to 200° C., and the laminate was heated and pressed for 2 minutes with a multistage press machine (compression molding machine manufactured by Shinto Metal Industries Corp., product name: SFA-50HH0) at a pressure of 0.1 MPa using board faces at 200° C. Subsequently, the laminate was cooled to room temperature at the same pressure, and thus a plate-shaped fiber-reinforced plastic having a thickness of 2 mm was obtained. For the fiber-reinforced plastic having a thickness of 2 mm thus obtained, pf, ec, and dp were measured.

The results obtained by evaluating the mechanical properties of the fiber-reinforced plastic having a thickness of 2 mm are presented in Table 3. The fiber-reinforced plastic had satisfactory mechanical properties, and also had less variation. Furthermore, the flexural strength ratio $\sigma_C/\sigma_D$ was 0.5 or higher, and the fiber-reinforced plastic had satisfactory heat resistance. Furthermore, the ratio $h_A/h_B$ was 1.5, and the fiber-reinforced plastic had satisfactory fluidity.

Example 13

A fiber-reinforced plastic plate having a thickness of 2 mm was obtained in the same manner as in Example 12, except that the prepreg substrate-2 was used instead of the prepreg substrate-1.

The results obtained by evaluating the mechanical properties of the fiber-reinforced plastic having a thickness of 2 mm are presented in Table 3. The fiber-reinforced plastic had satisfactory mechanical properties, and also had less variation. Furthermore, the flexural strength ratio $\sigma_C/\sigma_D$ was 0.5 or higher, and the fiber-reinforced plastic had satisfactory heat resistance. Furthermore, the ratio $h_A/h_B$ was 2.2, and the fiber-reinforced plastic had satisfactory fluidity.

Comparative Example 1

A fiber-reinforced plastic was obtained in the same manner as in Example 1, except that slits were not inserted into the prepreg substrate cut out from the prepreg substrate-1.

The results obtained by evaluating the mechanical properties of the fiber-reinforced plastic are presented in Table 2. In the fiber-reinforced plastic, the mechanical properties obviously lacked isotropy and were not well controlled. The fiber-reinforced plastic also had low fluidity.

Comparative Example 2

An incision-inserted prepreg substrate was obtained in the same manner as in Example 1, except that rectangular-shaped prepreg substrate sheets each having a size of 220 mm (30°-direction with respect to the fiber axis)×900 mm (−60°-direction with respect to the fiber axis) were cut out from the prepreg substrate-1. Eight sheets of the incision-inserted prepreg substrate were laminated such that the fiber axes of the reinforcing fibers were in the same direction, and a prepreg laminate having a thickness of 1.0 mm was obtained.

A fiber-reinforced plastic was obtained in the same manner as in Example 1, except that the prepreg laminate was introduced into a double belt-type heat press machine such that the angle θ would be 30°.

The results obtained by evaluating the mechanical properties of the fiber-reinforced plastic are presented in Table 2. In the fiber-reinforced plastic, the mechanical properties obviously lacked isotropy and were not well controlled. Also, the fiber-reinforced plastic had low fluidity.

Comparative Example 3

An incision-inserted prepreg substrate was obtained in the same manner as in Example 1, except that rectangular-shaped prepreg substrate sheets each having a size of 220 mm (45°-direction with respect to the fiber axis)×900 mm (−45°-direction with respect to the fiber axis) were cut out from the prepreg substrate-1. Eight sheets of the incision-inserted prepreg substrate were laminated such that the fiber axes of the reinforcing fibers were in the same direction, and a prepreg laminate having a thickness of 1.0 mm was obtained.

A fiber-reinforced plastic was obtained in the same manner as in Example 1, except that the prepreg laminate was introduced into a double belt-type heat press machine such that the angle θ would be 45°.

The results obtained by evaluating the mechanical properties of the fiber-reinforced plastic are presented in Table 2. In the fiber-reinforced plastic, the mechanical properties obviously lacked isotropy and were not well controlled. Also, the fiber-reinforced plastic had low fluidity.

Comparative Example 4

An incision-inserted prepreg substrate was obtained in the same manner as in Example 1, except that rectangular-shaped prepreg substrate sheets each having a size of 220 mm (90°-direction with respect to the fiber axis)×900 mm (0°-direction with respect to the fiber axis) were cut out from the prepreg substrate-1. Eight sheets of the incision-inserted prepreg substrate were laminated such that the fiber axes of the reinforcing fibers were in the same direction, and a prepreg laminate having a thickness of 1.0 mm was obtained.

A fiber-reinforced plastic was obtained in the same manner as in Example 1, except that the prepreg laminate was introduced into a double belt-type heat press machine such that the angle θ would be 60°.

The results obtained by evaluating the mechanical properties of the fiber-reinforced plastic are presented in Table 2. In the fiber-reinforced plastic, the mechanical properties obviously lacked isotropy and were not well controlled. Also, the fiber-reinforced plastic had low fluidity.

Comparative Example 5

Band-shaped slits having a width of 15.0 mm were inserted into the prepreg substrate-3 obtained in Production Example 3, and then the prepreg substrate-3 was continuously cut into a length of 25.0 mm using a guillotine type cutting machine. Thus, chopped strand prepreg sheets each having a fiber length of 25.0 mm was obtained. 244 g of the chopped strand prepreg sheets thus obtained were weighed, and the chopped strand prepreg sheets were freely dropped sheet by sheet from a place at a height of 30 cm into a pillbox mold measuring 300 mm on each side and 15 mm in depth so as to laminate the sheets such that the fiber orientation was random.

The pillbox mold in which the chopped strand prepreg sheets were laminated was heated to 200° C., and then the prepreg sheets were heated and pressed for 2 minutes using a multistage press machine (compression molding machine manufactured by Shinto Metal Industries Corp., product name: SFA-50HH0) at a pressure of 0.1 MPa using board faces at 200° C. Subsequently, the laminate was cooled to room temperature at the same pressure, and thus a plate-shaped fiber-reinforced plastic having a thickness of 2 mm was obtained. For the fiber-reinforced plastic having a thickness of 2 mm thus obtained, pf, ec, and dp were measured.

The results obtained by evaluating the mechanical properties of the fiber-reinforced plastic are presented in Table 3. The fiber-reinforced plastic had large variation in the mechanical properties, and lacked heat resistance.

Comparative Example 6

An incision-inserted prepreg substrate was obtained by cutting out prepreg substrate sheets each measuring 300 mm on each side from the prepreg substrate-1, and inserting linear-shaped slits at a constant interval, using a cutting plotter (L-2500 cutting plotter manufactured by Laserck Corp.). Slit processing was performed in a part that was on the inner side than the parts extending to 5 mm from the circumference in the prepreg substrate, such that the fiber length of the carbon fibers was 25.0 mm, the length of the slits was 20.0 mm, and the angle φ formed by the fiber axes of the reinforcing fibers and the slits was 30°. Sixteen sheets of the incision-inserted prepreg substrate were laminated such that the fiber directions of the various incision-inserted prepreg substrate sheets would be 0°/45°/90°/−45°/−45°/90°/45°/0°/0°/45°/90°/−45°/−45°/90°/45°/0° from the above. The laminate incision-inserted prepreg substrate sheets were spot welded with an ultrasonic welding machine (manufactured by Emerson Japan, Ltd., product name: 2000LPt), and thereby a pseudo-isotropic ([0/45/90/−45]s2) prepreg laminate was produced.

The prepreg laminate was disposed inside a pillbox mold which measured 300 mm on each side and 15 mm in depth, the mold was heated to 200° C., and then the prepreg laminate was heated and pressed for 2 minutes using a multistage press machine (compression molding machine manufactured by Shinto Metal Industries, Ltd., product name: SFA-50HH0) at a pressure of 0.2 MPa using board faces at 200° C. Subsequently, the laminate was cooled to room temperature at the same pressure, and thus a plate-shaped fiber-reinforced plastic having a thickness of 2 mm was obtained. For the fiber-reinforced plastic having a thickness of 2 mm thus obtained, pf, ec, and dp were measured.

The results obtained by evaluating the mechanical properties of the fiber-reinforced plastic are presented in Table 3. The fiber-reinforced plastic had inferior heat resistance.

Comparative Example 7

Carbon fibers (PYROFIL TR 50S manufactured by Mitsubishi Rayon Co., Ltd.) were cut into 6 mm using a rotary cutter, and thereby chopped carbon fibers were obtained. Similarly, fibers formed from an acid-modified polypropylene resin (MODIC P958V manufactured by Mitsubishi Chemical Corp., MFR 50) were cut into 3 mm, and chopped polypropylene fibers were obtained. 0.74 kg of the chopped polypropylene fibers was introduced into 110 kg of an aqueous solution of polyethylene oxide at a mass concentration of 0.12%, and the fibers were sufficiently stirred using a stirrer. Subsequently, 0.37 kg of the chopped carbon fibers was introduced therein, the mixture was stirred for 10 seconds, and thus a dispersion liquid was obtained. The dispersion liquid thus obtained was flowed into a mesh frame which measured 100 cm on each side, and the aqueous solution of polyethylene oxide was filtered. Subsequently, moisture was completely eliminated in a dryer at 120° C., and thus a prepreg substrate having a fiber volume percentage content of 20% by volume (fiber mass percentage content: 33% by mass) and a basis weight of 1.11 kg/m² was obtained. The prepreg substrate thus obtained was cut out into sheets which measured 30 cm on each side, and two sheets thereof were superposed to obtain a prepreg laminate. The prepreg laminate was disposed inside a pillbox mold which measured 300 mm on each side and 15 mm in depth, the mold was heated to 200° C., and then the prepreg laminate was heated and pressed for 2 minutes using a multistage press machine (compression molding machine manufactured by Shinto Metal Industries, Ltd., product name: SFA-50HH0) at a pressure of 0.2 MPa using board faces at 200° C. Subsequently, the laminate was cooled to room temperature at the same pressure, and thus a plate-shaped fiber-reinforced plastic having a thickness of 2 mm was obtained. For the fiber-reinforced plastic having a thickness of 2 mm thus obtained, pf, ec, and dp were measured.

The results obtained by evaluating the mechanical properties of the fiber-reinforced plastic are presented in Table 3. The fiber-reinforced plastic had inferior fluidity.

Comparative Example 8

Chopped carbon fibers and chopped polypropylene fibers were obtained in the same manner as in Comparative Example 7. 0.63 kg of the chopped polypropylene fibers was introduced into 115 kg of an aqueous solution of polyethylene oxide at a mass concentration of 0.12%, and the mixture was sufficiently stirred using a stirrer. Subsequently, 0.54 kg of the chopped carbon fibers was introduced therein, the mixture was stirred for 10 seconds, and a dispersion liquid was obtained. The dispersion liquid thus obtained was flowed into a mesh frame which measured 100 cm on each side, and the aqueous solution of polyethylene oxide was filtered. Subsequently, moisture was completely eliminated in a dryer at 120° C., and thus a prepreg substrate having a fiber volume percentage content of 30% by volume (fiber mass percentage content: 46% by mass) and a basis weight of 1.17 kg/m² was obtained. The prepreg substrate thus obtained was cut out into sheets which measured 30 cm on each side, and two sheets thereof were superposed to obtain a prepreg laminate. A plate-shaped fiber-reinforced plastic having a thickness of 2 mm was obtained in the same manner as in Comparative Example 7, using the prepreg laminate.

The results obtained by evaluating the mechanical properties of the fiber-reinforced plastic are presented in Table 3. The fiber-reinforced plastic had inferior fluidity.

TABLE 1

| | | | Example | | | | | | | |
|---|---|---|---|---|---|---|---|---|---|---|
| | | | 1 | 2 | 3 | 4 | 5 | 6 | 7 | 8 |
| Slit-inserted prepreg | Angle φ [°] | | 45 | 45 | 30 | 60 | 60 | 60 | 90 | 45 |
| | Fiber length L [mm] | | 25 | 25 | 25 | 25 | 25 | 25 | 25 | 12.5 |
| Prepreg laminate | Number of laminations [sheets] | | 8 | 16 | 8 | 8 | 4 | 16 | 8 | 8 |
| | Thickness (mm) | | 1 | 1.9 | 1 | 1 | 0.5 | 1.9 | 1 | 1 |
| Pressing conditions | Angle θ [°] | | 0 | 0 | 0 | 0 | 0 | 0 | 0 | 0 |
| | Travel speed of laminate [m/min] | | 1 | 1 | 1 | 1 | 1 | 1 | 1 | 1 |
| Flexural strength (MD direction) | Room temperature | Average value [MPa] | 251 | 209 | 352 | 262 | 303 | 212 | 329 | 194 |
| | | CV value [%] | 4.2 | 8.2 | 2.2 | 6.5 | 8.4 | 9.9 | 7.3 | 3.4 |
| | 80° C. | Average value [MPa] | 157 | 109 | 209 | 162 | — | 134 | 161 | 112 |
| | | CV value [%] | 8.3 | 9.9 | 1.8 | 3.6 | — | 6.5 | 7.8 | 3.1 |
| Flexural strength (TD direction) | Room temperature | Average value [MPa] | 393 | 349 | 450 | 402 | 449 | 371 | 339 | 322 |
| | | CV value [%] | 5.8 | 4.2 | 6.8 | 5.1 | 8.3 | 3.2 | 8.5 | 5.6 |
| | 80° C. | Average value [MPa] | 207 | 188 | 214 | 254 | — | 201 | 194 | 179 |
| | | CV value [%] | 8.0 | 9.4 | 2.7 | 8.1 | — | 2.0 | 5.2 | 6.0 |
| Flexural strength ratio $\sigma_A/\sigma_B$ | | | 0.64 | 0.60 | 0.78 | 0.65 | 0.67 | 0.57 | 0.97 | 0.60 |
| Flexural strength ratio $\sigma_C/\sigma_D$ | | | 0.58 | 0.53 | 0.53 | 0.63 | — | 0.59 | 0.53 | 0.57 |
| Fluidity [times] | | | 1.5 | — | — | — | — | — | — | — |

TABLE 2

|  |  | Example | | | | Comparative Example | | | |
| --- | --- | --- | --- | --- | --- | --- | --- | --- | --- |
|  |  | 9 | 10 | 11 | 12 | 1 | 2 | 3 | 4 |
| Slit-inserted prepreg | Angle φ [°] | 45 | 45 | 45 | 45 | No slits | 45 | 45 | 45 |
|  | Fiber length L [mm] | 25 | 25 | 25 | 25 |  | 25 | 25 | 25 |
| Prepreg laminate | Number of laminations [sheets] | 8 | 8 | 8 | 4 | 8 | 8 | 8 | 8 |
|  | Thickness (mm) | 1 | 1 | 1 | 0.5 | 1 | 1 | 1 | 1 |
| Pressing conditions | Angle θ [°] | 0 | 0 | 15 | 0 | 0 | 30 | 45 | 60 |
|  | Travel speed of laminate [m/min] | 0.5 | 2 | 1 | 1 | 1 | 1 | 1 | 1 |
| Flexural strength (MD direction) | Room temperature Average value [MPa] | 380 | 152 | 199 | — | — | — | — | — |
|  | CV value [%] | 3.3 | 8.0 | 10.2 | — | — | — | — | — |
|  | 80° C. Average value [MPa] | 226 | 101 | 124 | — | — | — | — | — |
|  | CV value [%] | 21.6 | 6.1 | 11.1 | — | — | — | — | — |
| Flexural strength (TD direction) | Room temperature Average value [MPa] | 457 | 413 | 360 | — | — | — | — | — |
|  | CV value [%] | 0.9 | 0.8 | 9.8 | — | — | — | — | — |
|  | 80° C. Average value [MPa] | 261 | 236 | 188 | — | — | — | — | — |
|  | CV value [%] | 7.9 | 6.9 | 8.0 | — | — | — | — | — |
| Flexural strength ratio $\sigma_A/\sigma_B$ | | 0.83 | 0.37 | 0.55 | — | X | X | X | X |
| Flexural strength ratio $\sigma_C/\sigma_D$ | | 0.58 | 0.62 | 0.57 | — | — | — | — | — |
| Fluidity [times] | | — | — | — | 1.50 | X | — | — | — |

TABLE 3

|  | Example | | Comparative Example | | | |
| --- | --- | --- | --- | --- | --- | --- |
|  | 12 | 13 | 5 | 6 | 7 | 8 |
| Fiber volume percentage content (Vf) [vol %] | 35 | 17 | 49 | 35 | 20 | 30 |
| Fiber length L [mm] | 25 | 25 | 75 | 25 | 6 | 6 |
| Degree of orientation pf | 0.03 | — | 0.36 | 0.04 | 1.20 | — |
| Eccentricity coefficient ec (×10$^{-5}$) | 6.2 | — | 8.5 | 9.4 | 2.8 | — |
| Dispersion parameter dp | 94 | — | 72 | 75 | 95 | — |
| Flexural strength (MD direction, room temperature) Average value [MPa] | 295 | 235 | 218 | 268 | 253 | 301 |
| CV value [%] | 4.8 | 9.8 | 23.5 | 4.5 | 6.7 | 5.1 |
| Flexural strength (MD direction, 80° C.) Average value [MPa] | 172 | 135 | 96 | 129 | 154 | 177 |
| CV value [%] | 6.9 | 9.5 | 17.5 | 2.9 | 5.5 | 2.8 |
| Flexural strength (TD direction, room temperature) Average value [MPa] | 413 | 286 | 238 | 311 | 286 | 283 |
| CV value [%] | 6.2 | 9.6 | 15.1 | 5.1 | 6.7 | 4.6 |
| Flexural strength (TD direction, 80° C.) Average value [MPa] | 257 | 173 | 107 | 149 | 166 | 156 |
| CV value [%] | 4.2 | 4.5 | 17.1 | 7.4 | 6.6 | 0.4 |
| Flexural strength ratio $\sigma_A/\sigma_B$ | 0.71 | 0.82 | 0.92 | 0.86 | 0.88 | 1.06 |
| Flexural strength ratio $\sigma_C/\sigma_D$ | 0.60 | 0.59 | 0.44 | 0.48 | 0.59 | 0.57 |
| Fluidity [times] | 1.5 | 2.2 | 2.4 | 2.8 | X | X |

INDUSTRIAL APPLICABILITY

The fiber-reinforced plastic obtainable by the production method of the present invention has excellent shapeability into complicated three-dimensional shapes such as a rib and a boss, and can be molded in a short time period. Furthermore, regarding this fiber-reinforced plastic, a component part shaped therefrom has excellent mechanical properties that can be applied to structural materials, has less variation, and exhibits controllable isotropy or anisotropy. Therefore, the fiber-reinforced plastic is suitably used for aircraft members, automotive members, wind power generating windmill members, sports goods, and the like.

EXPLANATIONS OF LETTERS OR NUMERALS

1 DOUBLE BELT-TYPE HEAT PRESS MACHINE
10 PRESS ROLL
12 BELT
14 IR HEATER
16 WARM WATER ROLL
18 WINDING ROLL
20 DRIVING ROLL
22 DRIVEN ROLL
24 GUIDE ROLL
100 MATERIAL (A)
110 REINFORCING FIBER
120 FIBER-REINFORCED PLASTIC
X DIRECTION ORTHOGONAL TO TRAVEL DIRECTION OF MATERIAL (A)
Y DIRECTION OF FIBER AXIS OF REINFORCING FIBER

The invention claimed is:

1. A method for producing a fiber-reinforced plastic, the method comprising:
(i) pressing a material (A) with a pressing apparatus that applies pressure approximately uniformly in a direction orthogonal to a travel direction of the material (A); and
(ii) cooling the material (A) that has been pressed by the pressing apparatus, thereby obtaining a fiber-reinforced plastic,
wherein:
the material (A) comprises a plurality of sheets of a prepreg substrate in which reinforcing fibers of all sheets are unidirectionally arranged in parallel are impregnated with a matrix resin, and slits are formed so as to intersect the fiber axes;

the pressing (i) occurs such that the material (A) travels in the travel direction, with the reinforcing fibers of the plurality of sheets of the prepreg substrate forming an angle θ of −20° to 20° with respect to the direction orthogonal to the travel direction, in a state in which the material (A) is heated to a temperature T that is higher than or equal to a melting point of the matrix resin, or is higher than or equal to a glass transition temperature if the matrix resin does not have a melting point; and the fiber axial directions of the reinforcing fibers are randomized during the pressing (i).

2. The method for producing a fiber-reinforced plastic according to claim 1, wherein the pressing (i) comprises (i-1) pressing the material (A) in a state of being heated to the temperature T, while causing the material (A) to travel in the travel direction, with the pressing apparatus which includes at least a pair of press rolls, with the shaft line direction of the rolls coinciding with the direction orthogonal to the travel direction.

3. The method for producing a fiber-reinforced plastic according to claim 2, wherein the press rolls are heated rolls.

4. The method for producing a fiber-reinforced plastic according to claim 1, wherein the angle θ is adjusted to −5° to 5.

5. The method for producing a fiber-reinforced plastic according to claim 1, wherein a thickness of the material (A) is 0.25 mm to 6.0 mm.

6. The method for producing a fiber-reinforced plastic according to claim 1, wherein the matrix resin is a thermoplastic resin.

7. The method for producing a fiber-reinforced plastic according to claim 1, wherein the matrix resin comprises at least one selected from the group consisting of a polyolefin resin, a modified polypropylene resin, a polyamide resin, and a polycarbonate resin.

8. The method for producing a fiber-reinforced plastic according to claim 1, wherein a length L of the reinforcing fibers cut by slits in the plurality of sheets of the prepreg substrate is 1 mm to 100 mm.

9. The method for producing a fiber-reinforced plastic according to claim 2, wherein the pressing (i-1) occurs using a double belt heat press machine, wherein the material (A) is interposed between the at least one pair of belts and is heated while the material (A) is caused to travel so as to pass through between at least one pair of press rolls, and the material (A) is pressed with the at least one pair of press rolls.

* * * * *